(12) United States Patent
Inagaki et al.

(10) Patent No.: US 10,961,996 B2
(45) Date of Patent: Mar. 30, 2021

(54) CLOSED COMPRESSOR AND REFRIGERATION DEVICE

(71) Applicant: PANASONIC APPLIANCES REFRIGERATION DEVICES SINGAPORE, Singapore (SG)

(72) Inventors: Ko Inagaki, Shiga (JP); Takahiro Kondou, Fukuoka (JP); Yasuhiro Bonkobara, Miyazaki (JP)

(73) Assignee: PANASONIC APPLIANCES REFRIGERATION DEVICES SINGAPORE, Singapore (SG)

( * ) Notice: Subject to any disclaimer, the term of this patent is extended or adjusted under 35 U.S.C. 154(b) by 370 days.

(21) Appl. No.: 15/505,018

(22) PCT Filed: May 27, 2016

(86) PCT No.: PCT/JP2016/002566
§ 371 (c)(1),
(2) Date: Feb. 17, 2017

(87) PCT Pub. No.: WO2016/189880
PCT Pub. Date: Dec. 1, 2016

(65) Prior Publication Data
US 2017/0268492 A1    Sep. 21, 2017

(30) Foreign Application Priority Data

May 28, 2015  (JP) .............................. JP2015-108138
Mar. 25, 2016 (JP) .............................. JP2016-061177

(51) Int. Cl.
*F04B 39/00* (2006.01)
*F04B 39/02* (2006.01)
(Continued)

(52) U.S. Cl.
CPC .......... *F04B 39/0044* (2013.01); *F04B 35/04* (2013.01); *F04B 39/00* (2013.01);
(Continued)

(58) Field of Classification Search
CPC ................ F04B 39/0044; F04B 39/023; F04B 39/0094; F04B 39/127; F04B 39/02;
(Continued)

(56) References Cited

U.S. PATENT DOCUMENTS 3,540,813 A * 11/1970 Murphy .................. F25B 31/02
417/363
3,836,290 A * 9/1974 Carter ..................... F04B 35/04
417/415

(Continued)

FOREIGN PATENT DOCUMENTS

JP        6-081766        3/1994
JP        2003-003958     1/2003
(Continued)

OTHER PUBLICATIONS

"Definition of Point" (Year: 2014).*
Definition—About (Year: 2013).*

*Primary Examiner* — Essama Omgba
*Assistant Examiner* — Christopher J Brunjes
(74) *Attorney, Agent, or Firm* — Hamre, Schumann, Mueller & Larson, P.C.

(57) ABSTRACT

A closed compressor includes: a compressor body; and a closed vessel in which the compressor body is accommodated and oil is stored. The compressor body has an electric element and a compression element that is driven by the electric element. The compression element has a cylinder block that forms a cylinder, a piston that performs a reciprocating motion in the cylinder, and a crankshaft that actuates the piston. The cylinder block configures a bearing that (Continued)

pivotally supports the crankshaft. The cylinder forms a compression chamber. The compressor body has a support that forms a curved surface. A contact portion, at which the curved surface comes into contact with a receiving surface in the closed vessel, is formed.

35 Claims, 23 Drawing Sheets

(51) Int. Cl.
    *F04B 1/02*    (2006.01)
    *F16J 1/10*    (2006.01)
    *F04B 35/04*    (2006.01)
    *F04B 39/12*    (2006.01)
    *F25B 1/02*    (2006.01)

(52) U.S. Cl.
    CPC ........ *F04B 39/0094* (2013.01); *F04B 39/023* (2013.01); *F04B 39/122* (2013.01); *F04B 39/127* (2013.01); *F16J 1/10* (2013.01); *F25B 1/02* (2013.01); *F04B 39/02* (2013.01); *F25B 2500/13* (2013.01)

(58) Field of Classification Search
    CPC .... F04B 39/122; F04B 39/0276; F04B 35/04; F04B 2203/0406; F04B 2203/0206; F04B 2203/0602; F04B 2201/0802; F25B 1/02; F25B 2500/13
    USPC .... 417/363, 902; 248/596, 598, 648, 306.05
    See application file for complete search history.

(56) References Cited

U.S. PATENT DOCUMENTS

| | | | | |
|---|---|---|---|---|
| 4,544,334 | A * | 10/1985 | Ellis | H02K 1/18 29/596 |
| 5,252,038 | A * | 10/1993 | Mangyo | F04B 39/127 417/363 |
| 5,342,179 | A * | 8/1994 | Dreiman | F04B 39/127 417/363 |
| 6,435,841 | B1 * | 8/2002 | Kim | F04B 39/0033 417/312 |
| 2006/0153710 | A1 * | 7/2006 | Kakiuchi | F04B 39/0094 417/415 |
| 2007/0031275 | A1 * | 2/2007 | Nogawa | F04C 29/0021 418/55.2 |
| 2013/0052056 | A1 * | 2/2013 | Kim | F04B 35/04 417/410.1 |
| 2014/0213907 | A1 * | 7/2014 | Havel | G01S 15/894 600/466 |
| 2015/0052936 | A1 * | 2/2015 | Yokoyama | F25B 31/004 62/470 |

FOREIGN PATENT DOCUMENTS

| | | |
|---|---|---|
| JP | 2005307845 A * | 11/2005 |
| JP | 2007-107469 | 4/2007 |
| JP | 2008-208812 | 9/2008 |
| JP | 2010-127191 | 6/2010 |

* cited by examiner

PRIOR ART

CLOSED COMPRESSOR AND REFRIGERATION DEVICE

TECHNICAL FIELD

The present invention relates to a closed compressor (hermetically sealed compressor) in which vibration is reduced by improving a structure that supports a compressor body in a closed vessel, and a refrigeration device equipped with the closed compressor

BACKGROUND ART

Since there have been a demand for improvement in energy saving and an increase in needs for power saving in recent years, thermal insulation performance of a refrigerator is improved, and thus it is highly necessary to take measures against lower performance (slower rotation) in a reciprocating compressor for the refrigerator.

During a slow rotation operation, vibration occurring in a closed compressor is likely to increase, and a problem arises in propagation of the vibration to a refrigerator body.

In a closed compressor in the related art, a compressor body is elastically supported using a spring in a closed vessel, and thereby propagation of vibration due to reciprocating motions of a piston is reduced (see PTL 1).

In addition, a configuration, in which a flat surface portion is provided in a part of an elastic support member that supports a compressor body in a closed vessel, the flat surface portion is disposed in a lubricant, and thereby vibration is attenuated using viscosity resistance of the lubricant, is also proposed (see PTL 2).

Both of PTL 1 and PTL 2 have the configuration in which the compressor body is supported using the elastic support member. During an operation with a very low number of rotations in the case of using the elastic support member, a resonance phenomenon occurs between a spring constant of the elastic support member and eigenvalues (a natural period and a natural frequency) due to a mass and a shape of the compressor body.

FIG. 22 is a characteristic graph illustrating a relationship between the number of rotations and a vibration ratio in a case where a compressor in the related art uses, as the elastic support member, a spring which is often used.

As illustrated in FIG. 22, when the number of rotations is lower than 30 r/s, vibration tends to significantly increase.

CITATION LIST

Patent Literature

PTL 1: Japanese Patent Unexamined Publication No. 2003-3958
PTL 2: Japanese Patent Unexamined Publication No. 2010-127191

SUMMARY OF THE INVENTION

This disclosure is made in consideration of such a problem, and particularly is to provide a closed compressor and a refrigeration device in which vibration due to a low number of rotations is reduced and thus it is possible to perform an operation at slow rotations.

A closed compressor of this disclosure includes: a compressor body; and a closed vessel in which the compressor body is accommodated and oil is stored. The compressor body has an electric element and a compression element that is driven by the electric element. The compression element has a cylinder block that forms a cylinder, a piston that performs a reciprocating motion in the cylinder, and a crankshaft that actuates the piston. The cylinder block configures a bearing that pivotally supports the crankshaft. The cylinder forms a compression chamber. The compressor body has a support that forms a curved surface. A contact portion, at which the curved surface comes into contact with a receiving surface in the closed vessel, is formed.

In addition, a refrigeration device of this disclosure uses the closed compressor described above.

In this configuration, vibration is reduced during an operation at a low number of rotations such that it is possible to reduce a noise due to vibration of the refrigeration device.

DESCRIPTION OF EMBODIMENTS

First Exemplary Embodiment

Hereinafter, a first exemplary embodiment of the invention will be described with reference to the accompanying figures.

Figure 1:
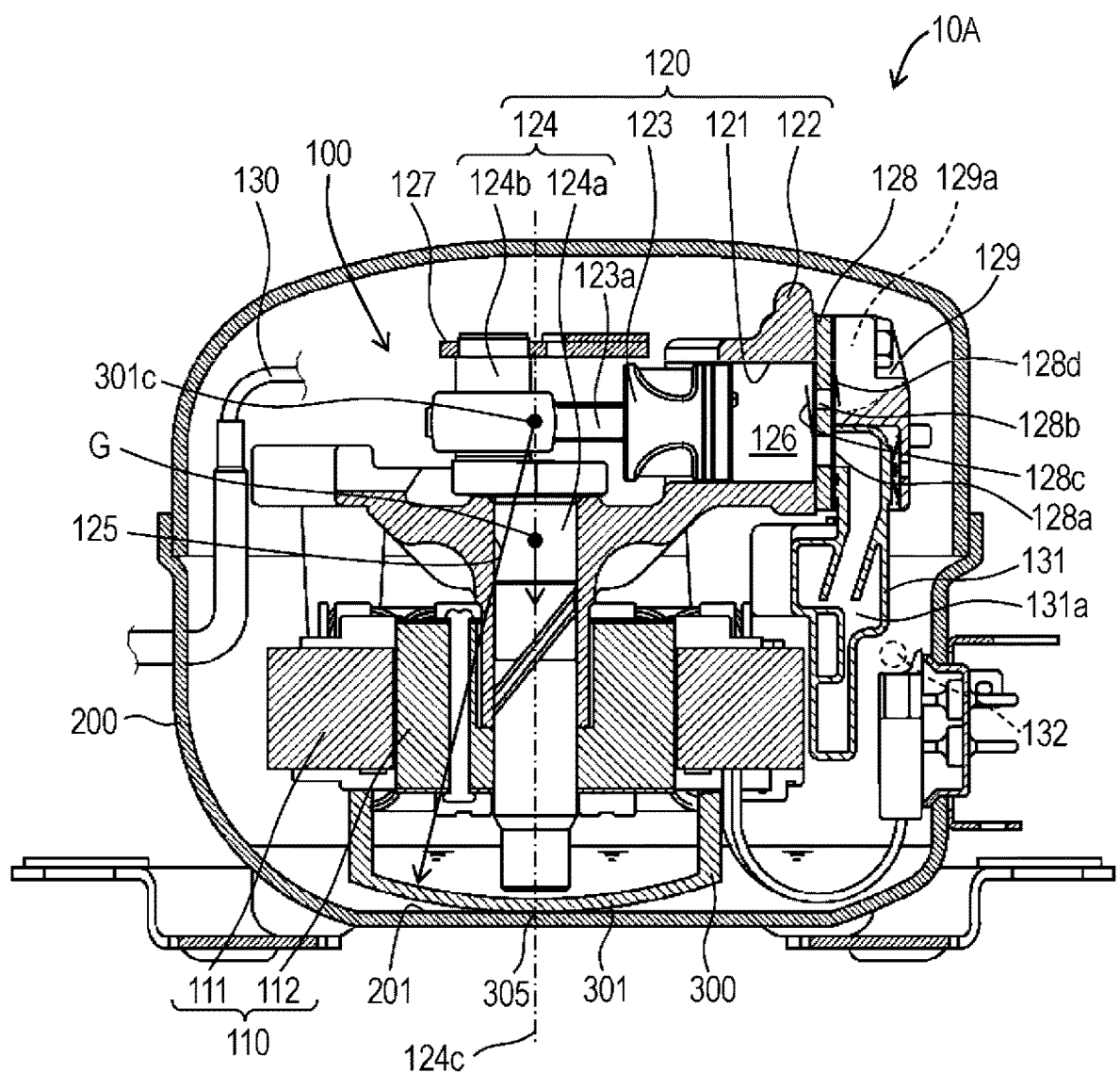
FIG. 1 is a sectional view of a closed compressor according to a first exemplary embodiment of the invention.

FIG. 1 is a sectional view of closed compressor 10A according to a first exemplary embodiment of the invention.

Closed compressor 10A according to the first exemplary embodiment includes compressor body 100 and closed vessel 200 that accommodates compressor body 100.

Compressor body 100 has electric element 110 and compression element 120 that is driven by electric element 110.

Electric element 110 has stator 111 and rotor 112 that holds a permanent magnet. Compression element 120 is disposed above electric element 110.

Compression element 120 has cylinder block 122 that forms cylinder 121, piston 123 that performs a reciprocating motion in cylinder 121, and crankshaft 124 that actuates piston 123.

Bearing 125 that pivotally supports crankshaft 124 is formed in cylinder block 122. Cylindrical compression chamber 126 is formed in cylinder 121.

Crankshaft 124 has main shaft 124a into which rotor 112 is press-fitted and fixed, and eccentric shaft 124b formed to be eccentric with respect to main shaft 124a.

Eccentric shaft 124b and piston 123 are connected via connecting rod 123a. Balance weight 127 is provided on an upper end of eccentric shaft 124b.

Valve plate 128 seals an end surface of compression chamber 126. Valve plate 128 is provided with suction port 128a that suctions low-pressure gas into compression chamber 126, and discharge port 128b that discharges high-pressure gas compressed in compression chamber 126. Suction port 128a is provided with reed valve 128c that is open on compression chamber 126 side, and discharge port 128b is provided with reed valve 128d that is open on high-pressure chamber 129a side.

Cylinder head 129 causes valve plate 128 to be pressed and fixed to cylinder block 122, and high-pressure chamber 129a is formed in the cylinder head. Discharge pipe 130 is connected to high-pressure chamber 129a. Discharge pipe 130 is pulled out to the outside of closed vessel 200.

Suction muffler 131 is provided with muffling space 131a inside the suction muffler, and the inside of closed vessel 200 communicates with suction port 128a. Discharge pipe 132 is connected to closed vessel 200. A connecting port of suction pipe 132 to closed vessel 200 is disposed in the vicinity of a suction opening of suction muffler 131.

Power supplied from a commercial power source is supplied to electric element 110 via a control circuit and an inverter, and thereby it is possible to cause rotor 112 of electric element 110 to rotate at any plurality of set numbers of rotations. At least one of the plurality of set numbers of rotations includes a number of rotations which is lower than a commercial power frequency, for example, a number of rotations set at a frequency of 20 Hz to 30 Hz. Rotor 112 causes crankshaft 124 to rotate, and a motion of eccentric shaft 124b of crankshaft 124 is transmitted to piston 123 via connecting rod 123a. As a result, piston 123 performs a reciprocating motion in compression chamber 126, and a refrigerant gas having low pressure is guided into closed vessel 200 through suction pipe 132, and is suctioned into compression chamber 126 from suction muffler 131. The refrigerant gas suctioned into compression chamber 126 is compressed in compression chamber 126, and then is discharged to high-pressure chamber 129a. The high-pressure refrigerant gas discharged to high-pressure chamber 129a is guided outside closed vessel 200 through discharge pipe 130.

Vibration occurring due to the reciprocating motions of piston 123 is canceled by balance weight 127; however, a part of the vibration remains. Hereinafter, a configuration for attenuating the residual vibration will be described.

A flat surface portion is formed on inner bottom 201 of closed vessel 200, and oil is stored on inner bottom 201. Note that inner bottom 201 may be formed to have a curved surface.

Compressor body 100 has support 300 in which curved surface 301 is formed, on a lower side of compressor body 100. Support 300 is fixed on the lower side of stator 111. It is preferable that support 300 is configured of a member having strength so as to withstand a load of compressor body 100. For example, it is possible to use a material selected from an iron plate pressed material, a resin material formed through injection molding, and the like. In the case of using the iron plate pressed material, manufacturing is easily performed at low costs. In the case of using the resin material, it is possible to reduce collision noises.

Inner bottom 201 of closed vessel 200 is set to a receiving surface. Inner bottom 201 as the receiving surface and curved surface 301 formed by support 300 come into contact with each other, and thus contact portion 305 is formed.

A height of center 301c of curvature of curved surface 301 is higher than or equal to a height of center G of gravity of compressor body 100 (FIG. 1 illustrating an example in which center 301c of curvature is positioned vertically above center G of gravity) center 301c of curvature of curved surface 301 may not be necessarily positioned vertically above center G of gravity of compressor body 100. Center G of gravity of compressor body 100 is the center of mass of electric element 110, compression element 120, and support 300, and compression element 120 includes balance weight 127, valve plate 128, cylinder head 129, discharge pipe 130, and suction muffler 131. Discharge pipe 130 is also fixed to closed vessel 200, in addition to compressor body 100, and thus, the mass of the discharge pipe may be subtracted from the mass of compressor body 100.

Curved surface 301 comes into contact with inner bottom 201 of closed vessel 200. In this manner, in a state in which curved surface 301 is in contact with inner bottom 201 of closed vessel 200 in contact portion 305, compressor body 100 is independently disposed. Therefore, the vibration of compressor body 100 is unlikely to be transmitted to closed vessel 200, and it is possible to attenuate the vibration of closed compressor 10A.

It is preferable that curved surface 301 and inner bottom 201 come into contact with each other vertically below center G of gravity of compressor body 100. In other words, it is preferable that contact portion 305 is disposed vertically below center G of gravity of compressor body 100. Curved surface 301 and inner bottom 201 come into contact with each other vertically below center G of gravity of compressor body 100, and thereby compressor body 100 independently has a predetermined posture. In this manner, a tilt of compressor body 100 is reduced, and thus it is possible to prevent a portion other than support 300 from colliding with closed vessel 200 such that it is possible to reduce transmission of the vibration of compressor body 100 to closed vessel 200.

Center G of gravity of compressor body 100 is coincident with axial core 124c of main shaft 124a. Curved surface 301 and inner bottom 201 come into contact with each other vertically below axial core 124c of main shaft 124a.

It is preferable that curved surface 301 is spherical. Curved surface 301 is spherical, and thereby a cycle of oscillation of compressor body 100 is constant in any oscillation directions. Therefore, the oscillation is stable such that it is possible to prevent a collision noise when an operation of closed compressor 10A is stopped. In the case where curved surface 301 is spherical, contact portion 305 is formed such that curved surface 301 and inner bottom 201 come into point contact with each other.

In addition, although not illustrated, curved surface 301 has at least a first curved surface and a second curved surface, and it is possible to have a configuration in which the first curved surface and the second curved surface have centers 301c of curvature thereof, at different positions, respectively. As described above, a plurality of curved surfaces having centers 301c of curvature, which are different from each other, are formed, for example, compressor body 100 is configured to more easily oscillate in a reciprocating direction of piston 123, and thereby the vibration due to the reciprocating motions of piston 123 can be unlikely to be transmitted to the outside.

In the exemplary embodiment, a rotation axis of crankshaft 124 is set to a vertical direction, and piston 123 is caused to perform the reciprocating motions in a horizontal direction. In this manner, it is possible to prevent a force from acting in the vertical direction from support 300, and it is possible to decrease an occurrence of vibration of closed compressor 10A.

In addition, as described in the exemplary embodiment, support 300 is configured to be attached on the lower side of electric element 110, and thereby it is easy to assemble compressor body 100. Support 300 may be configured to be fixed on a lower side of cylinder block 122.

Figure 2A:
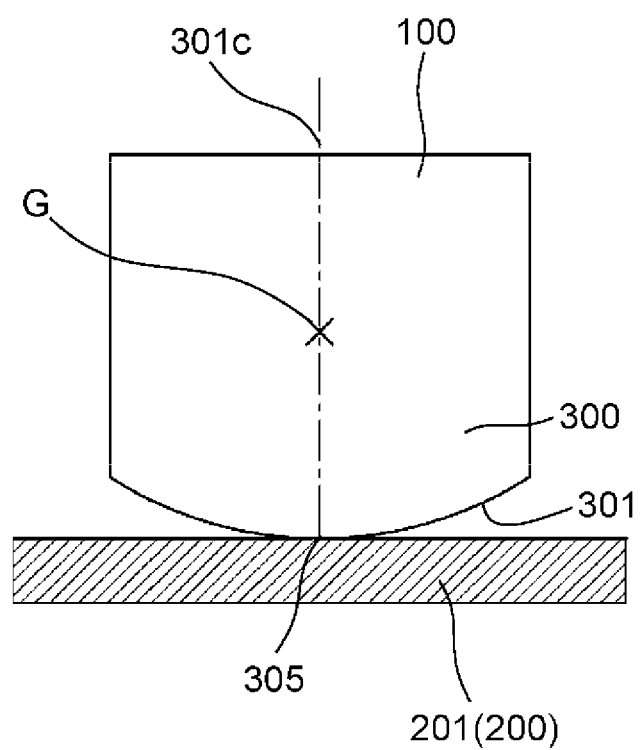
FIG. 2A is a diagram illustrating a relationship between the center of curvature of a curved surface and the center of gravity of the compressor body according to the first exemplary embodiment of the invention.
Figure 2B:
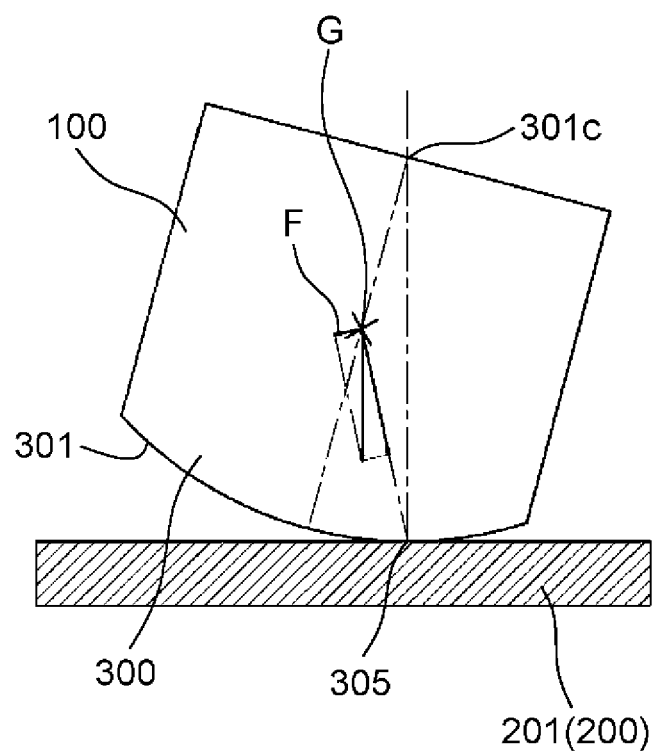
FIG. 2B is a diagram illustrating a relationship between the center of curvature of the curved surface and the center of gravity of the compressor body according to the first exemplary embodiment of the invention.

FIGS. 2A and 2B are diagrams illustrating a relationship between the center of curvature of the curved surface and the center of gravity of the compressor body according to the first exemplary embodiment of the invention. FIG. 2A illustrates a state in which the compressor body is independently disposed, and FIG. 2B illustrates a state in which the body tilts due to an external force.

FIGS. 2A and 2B illustrate a state in which compressor body 100 is mounted on flat inner bottom 201. Curved surface 301 is formed in support 300 on a lower side of compressor body 100. In the case where curved surface 301 is spherical, curved surface 301 and inner bottom 201 come into point contact with each other in contact portion 305, and contact portion 305 is formed at one position.

In addition, when center G of gravity of compressor body 100 is disposed at a position lower than or equal to the height of center 301c of curvature of curved surface 301, it is possible to return to the state in FIG. 2A with strength F of stability acting on, even though compressor body 100 even tilts as illustrated in FIG. 2B.

On the other hand, as in the related art, in a configuration in which compressor body 100 is supported by closed vessel 200 using a spring, a resonance phenomenon occurs between a spring constant of the spring and eigenvalues (a natural period and a natural frequency) due to the mass and the shape of compressor body 100, particularly in a slow rotating region of the compressor.

However, as illustrated in FIGS. 2A and 2B, in the state in which compressor body 100 is mounted on inner bottom 201, a resonance phenomenon is unlikely to occur between eigenvalues due to the mass and the shape of compressor body 100 and eigenvalues due to the mass or the shape of closed vessel 200 such that it is possible to significantly reduce a noise due to the vibration.

Here, a direction of the reciprocating motion of the piston is set to an x direction, and a direction (frontward-rearward direction of the paper surface) orthogonal to the x direction on a horizontal plane is set to a y direction. Then, in a case where curved surface 301 has center 301c of curvature (central axis of curvature) in the y direction, curved surface 301 and inner bottom 201 come into line contact with each other in the contact portion 305. In this manner, also in a case where curved surface 301 has center 301c of curvature (central axis of curvature) in the y direction, compressor body 100 is configured to have center G of gravity at a position lower than or equal to the height of center 301c of curvature (central axis of curvature) of the curved surface 301.

Figure 3:
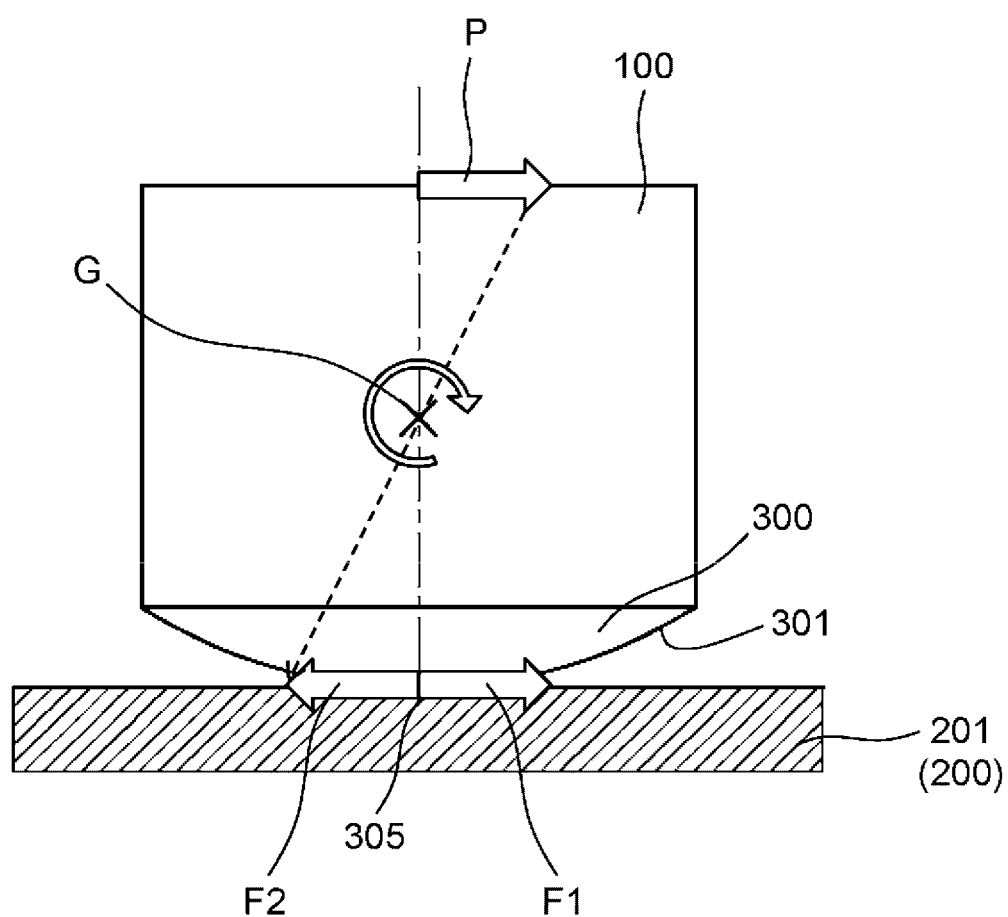
FIG. 3 is a diagram illustrating a force acting on a support according to the first exemplary embodiment of the invention.

FIG. 3 is a diagram illustrating a force acting on support 300 according to the first exemplary embodiment of the invention.

FIG. 3 illustrates a state in which compressor body 100 is mounted on flat inner bottom 201. Curved surface 301 is formed (to project downward) in support 300 on a lower side of compressor body 100.

As illustrated in the figure, excitation force P acts on compressor body 100 due to the reciprocating motions of piston 123, and thereby compressor body 100 vibrates. Acting force F1 in a translation direction and acting force F2 due to moment occur in contact portion 305 between curved surface 301 and inner bottom 201 due to excitation force P. In the exemplary embodiment, piston 123 is disposed above center G of gravity of compressor body 100, and thereby acting force F1 in the translation direction and acting force F2 due to the moment are applied in opposite directions. Therefore, it is possible to reduce oscillation of compressor body 100.

Second Exemplary Embodiment

Figure 4:
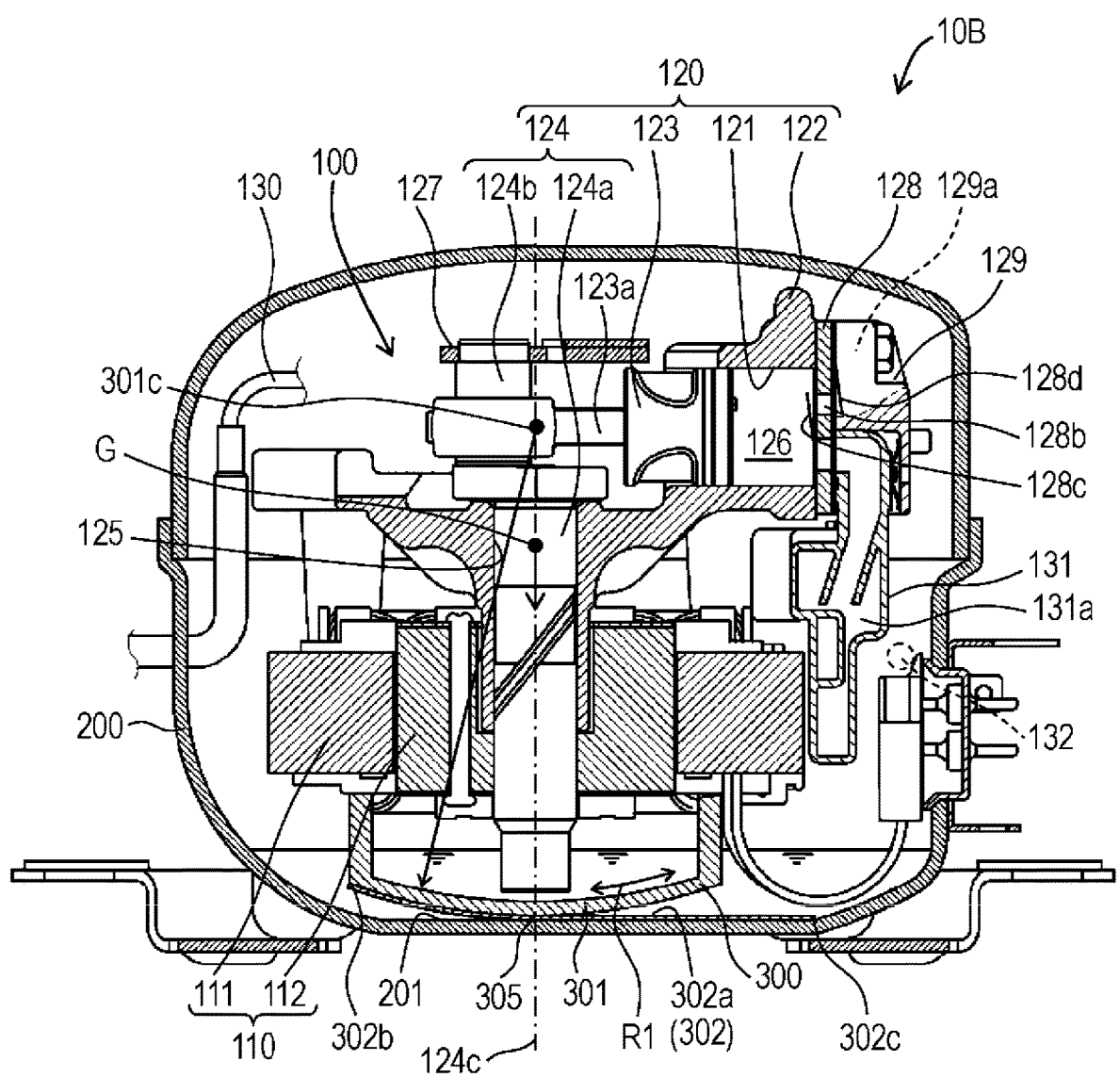
FIG. 4 is a sectional view of a closed compressor according to a second exemplary embodiment of the invention.
Figure 5:
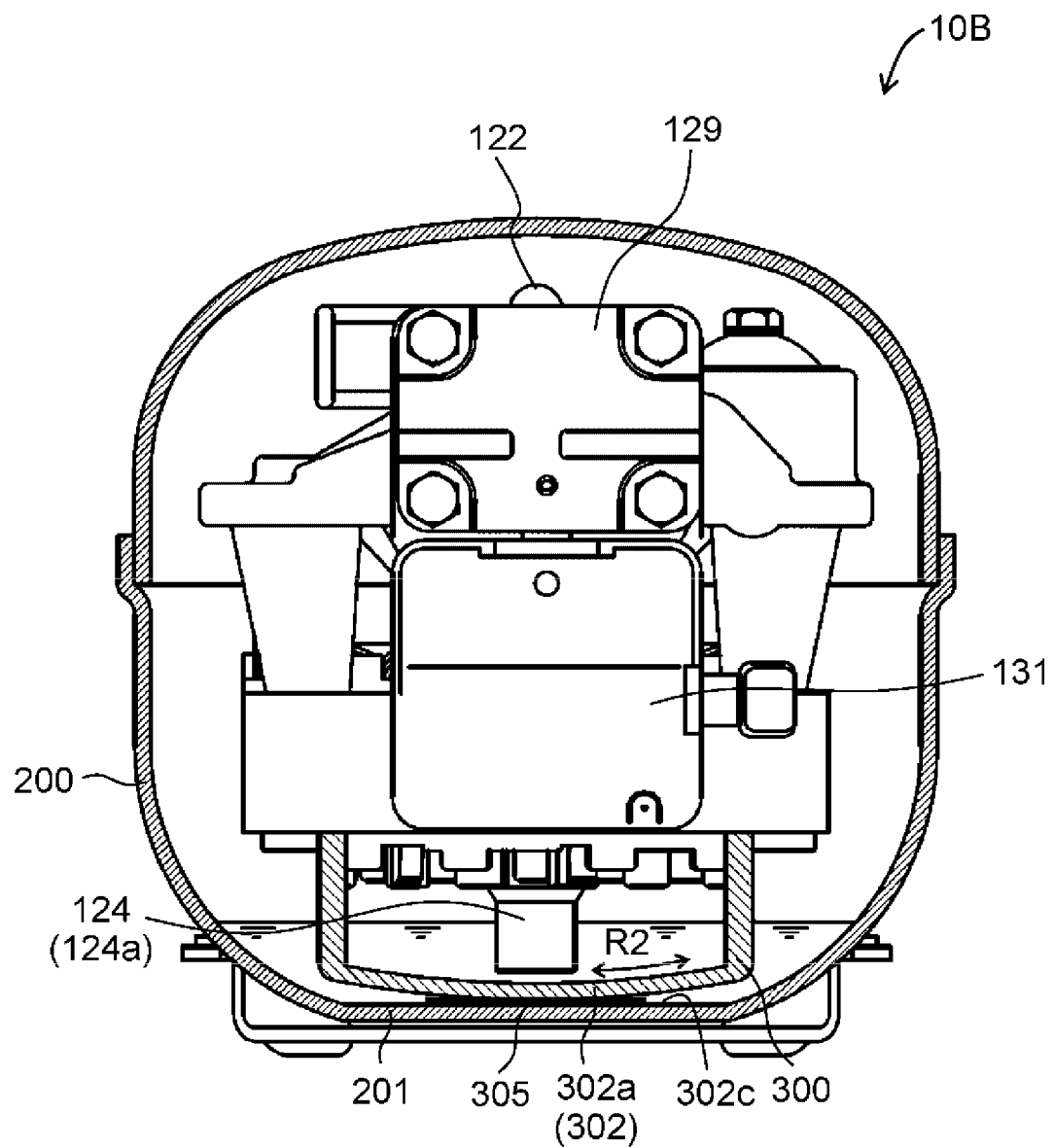
FIG. 5 is a sectional view of the closed compressor of which an orientation is changed by 90 degrees from a state in FIG. 4, according to the second exemplary embodiment of the invention.

FIG. 4 is a sectional view of closed compressor 10B according to a second exemplary embodiment of the invention, and FIG. 5 is a sectional view of closed compressor 10B of which an orientation is changed by 90 degrees from a state in FIG. 4.

The same reference marks are assigned to members having the same functions as those in the first exemplary embodiment, and description thereof is omitted.

In closed compressor 10B in the second exemplary embodiment of the invention, support 300 has restriction member 302 that restricts displacement of compressor body 100 from with respect to inner bottom (receiving surface) 201.

Restriction member 302 is formed of thin plate 302a made of an elastic material, one end 302b of thin plate 302a is attached to compressor body 100, and the other end 302c of thin plate 302a is attached to closed vessel 200. As a material of thin plate 302a, spring steel such as stainless steel (SUS) or a resin material is suitable. It is preferable that the width of thin plate 302a is thicker than the width of curved surface 301 of support 300. In addition, thin plate 302a is formed by using a plurality of plate materials, the plate materials are aligned such that a part of the materials overlap each other, and thereby the thin plate is easily formed to have a shape resembling curved surface 301 and inner bottom 201. Thin plate 302a may have a configuration in which the plurality of plate materials are stacked.

As described in the exemplary embodiment, restriction member 302 is provided, and thereby it is possible to restrict displacement of compressor body 100 in a large amount such that it is possible to prevent a noise due to collision of compressor body 100 with closed vessel 200. In addition, it is possible to prevent compressor body 100 from shifting from a preset position with respect to closed vessel 200. In this manner, it is possible to prevent compression performance from being degraded due to a shift in positions of a gas suction port of suction pipe 132 formed in closed vessel 200 and suction muffler 131 that guides suctioned gas to compression chamber 126.

In the exemplary embodiment, it is possible to realize restriction member 302 in a simple configuration of using, for example, thin plate 302a such that it is possible to prevent vibration from increasing due to free oscillation of compressor body 100.

In addition, on curved surface 301 of the exemplary embodiment, the first curved surface formed in the reciprocating direction of piston 123 and the second curved surface formed in the direction orthogonal to the reciprocating direction of piston 123 are formed. The first curved surface and the second curved surface have centers 301c of curvature at positions different from each other. In other words, when the curvature radius of the first curved surface formed in the reciprocating direction of piston 123 is represented by R1, and the curvature radius of the second curved surface formed in the direction orthogonal to the reciprocating direction of piston 123 is represented by R2, a relationship of R1<R2 is satisfied in this configuration. When R1<R2, for example, compressor body 100 is likely to oscillate in the reciprocating direction of piston 123, and thereby the vibration due to the reciprocating motions of piston 123 can be unlikely to be transmitted to the outside.

Restriction member 302 is formed of a resin material, and thereby it is possible to have a function as a resin buffer member. Restriction member 302 is the resin buffer member having a function as a buffering material between curved surface 301 and inner bottom 201, and thereby it is possible to prevent a collision noise from being produced between curved surface 301 and inner bottom 201 in a case where an impact is applied to compressor body 100 from the outside.

In addition, at least one of curved surface 301 and inner bottom 201 is formed of the resin material, and also thereby it is possible to prevent the collision noise from being produced.

Third Exemplary Embodiment

Figure 6:
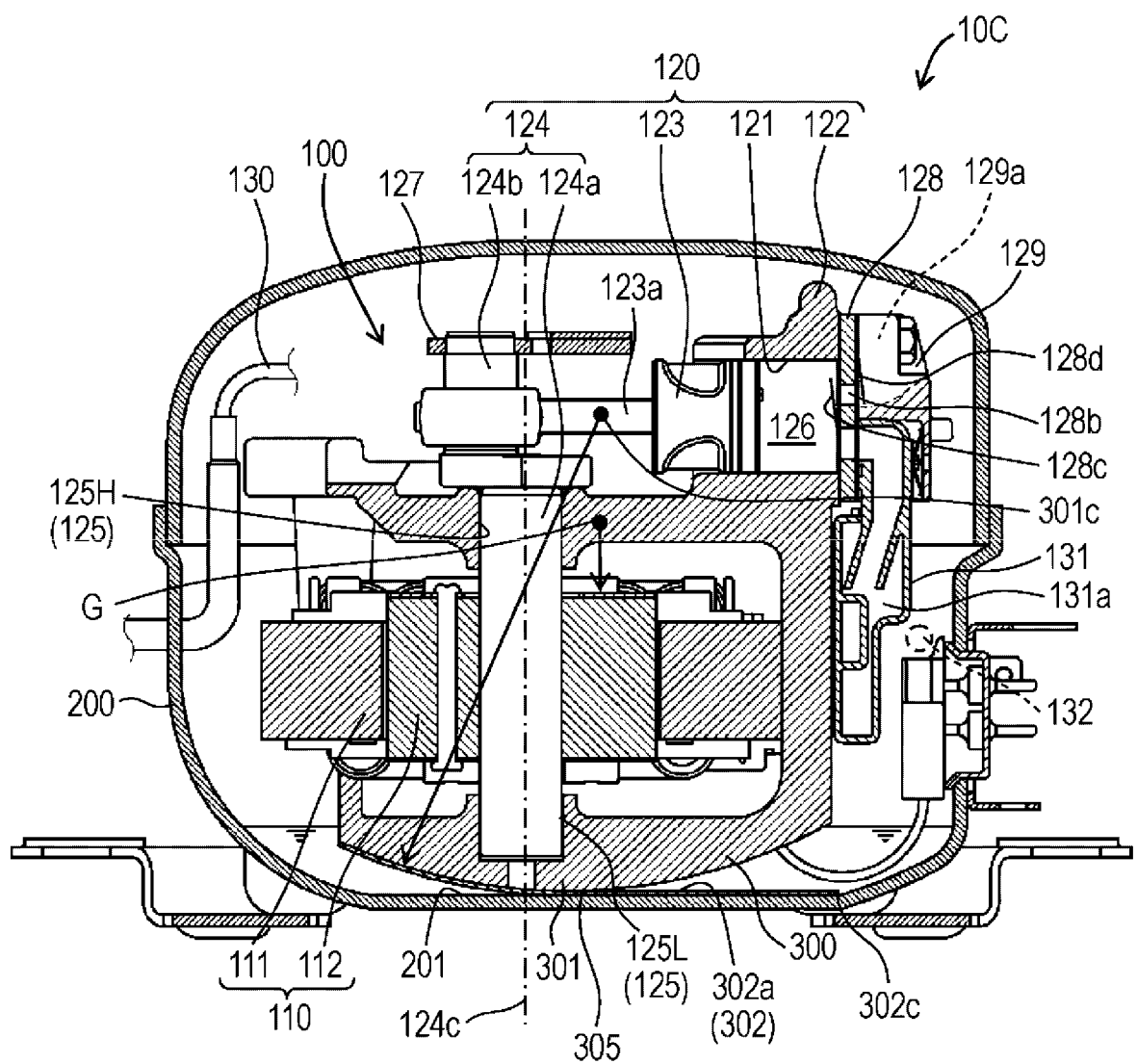
FIG. 6 is a sectional view of a closed compressor according to a third exemplary embodiment of the invention.

FIG. 6 is a sectional view of closed compressor 10C according to a third exemplary embodiment of the invention.

The same reference marks are assigned to members having the same functions as those in the second exemplary embodiment, and description thereof is omitted.

In closed compressor 10C in the third exemplary embodiment, bearing 125 has upper bearing 125ll disposed on an upper side from electric element 110 and lower bearing 125L disposed on a lower side from electric element 110. In the exemplary embodiment, bearing 125 is divided into two bearings and lower bearing 125L is disposed on the lower side from electric element 110, and thereby it is possible to lower center G of gravity of compressor body 100. Therefore, it is possible to reduce oscillation of compressor body 100 such that it is possible to prevent collision between compressor body 100 and closed vessel 200.

In addition, in closed compressor 10C according to the third exemplary embodiment, upper bearing 125ll, lower bearing 125L, and support 300 are formed in cylinder block 122. In the exemplary embodiment, at least support 300 is formed by cylinder block 122, and preferably, upper bearing 125ll, lower bearing 125L, and support 300 are formed in the cylinder block. In this manner, the number of component members decreases, and thus it is possible to achieve high productivity.

In the exemplary embodiment, axial core 124c of main shaft 124a of crankshaft 124 is not coincident with the position of center G of gravity of compressor body 100. Center G of gravity of compressor body 100 is positioned between axial core 124c of main shaft 124a and cylinder 121. In addition, curved surface 301 and inner bottom 201 are configured to come into contact with each other vertically below center G of gravity of compressor body 100. In addition, in the configuration, center 301c of curvature of curved surface 301 is positioned vertically above center G of gravity of compressor body 100, and is at a height higher than or equal to the height of center G of gravity of compressor body 100.

In the exemplary embodiment, center G of gravity of compressor body 100 is positioned between cylinder 121 and main shaft 124a, and thereby there is no need to dispose an object having the same mass as that of cylinder 121 on a side opposite to cylinder 121 with respect to main shaft 124a. Thus, it is possible to achieve light weight of closed compressor 10C and reduction in costs.

In addition, as in the exemplary embodiment, one contact portion 305 is disposed on cylinder 121 side from axial core 124c of crankshaft 124, and thereby there is no need to adjust center G of gravity such that it is possible to achieve reduction in costs.

Fourth Exemplary Embodiment

Figure 7:
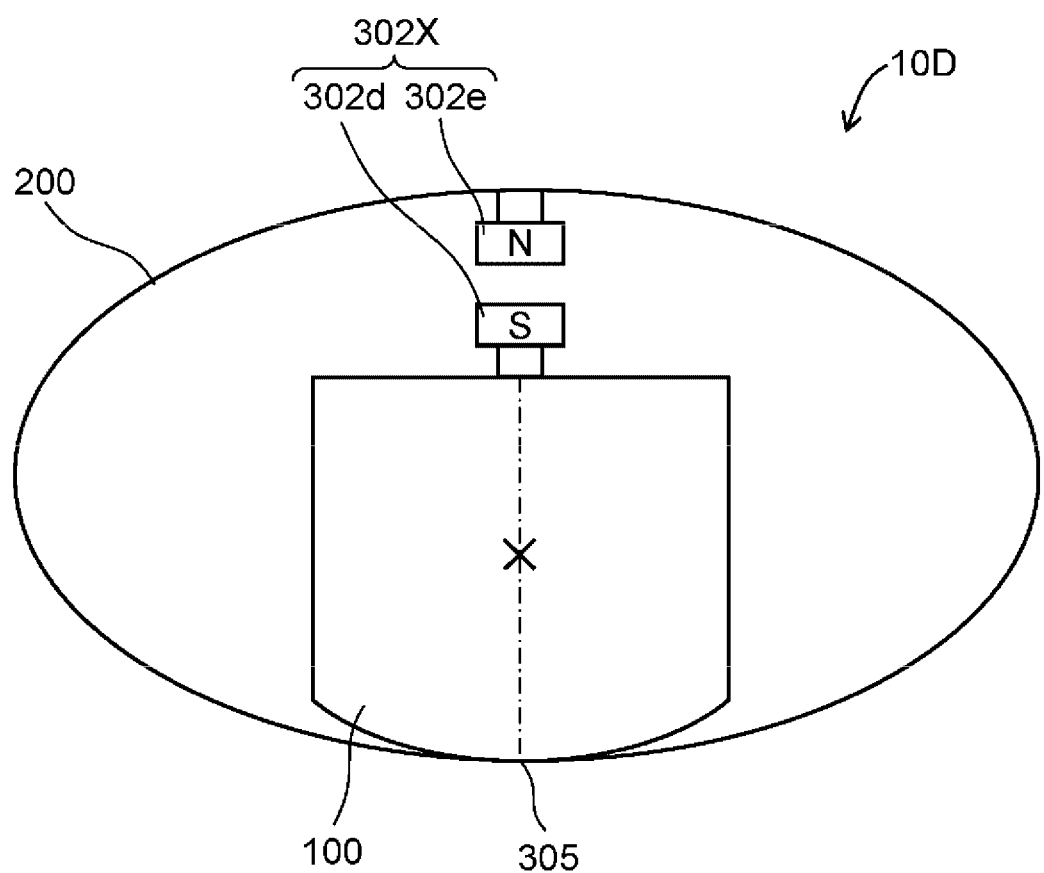
FIG. 7 is a conceptual diagram illustrating changed details of a closed compressor according to a fourth exemplary embodiment of the invention, in a part of a configuration of the closed compressors from the first exemplary embodiment to the third exemplary embodiment.

FIG. 7 is a conceptual diagram illustrating changed details in a part of a configuration of the closed compressors from the first exemplary embodiment to the third exemplary embodiment, in closed compressor 10D according to a fourth exemplary embodiment of the invention.

In FIG. 7, closed compressor 10D according to the fourth exemplary embodiment has the same basic configuration as closed compressors 10A to 10C from the first exemplary embodiment to the third exemplary embodiment, and magnetism unit 302X which will be described below is added. Magnetism unit 302X has a function as the restriction member. FIG. 7 illustrates only a concept of a configuration related to magnetism unit 302X, and omits illustration of the other configurations.

In closed compressor 10D described in the exemplary embodiment, magnetism unit 302X is provided between compressor body 100 and closed vessel 200.

Magnetism unit 302X is configured to have first magnetism portion 302d attached to compressor body 100, and second magnetism portion 302e attached to closed vessel 200.

FIG. 7 illustrates a case where a surface of first magnetism portion 302d which faces second magnetism portion 302e has the S pole, and a surface of second magnetism portion 302e which faces first magnetism portion 302d has the N pole.

In this manner, first magnetism portion 302d has the S pole and second magnetism portion 302e has the N pole, and thereby a force of attraction is generated between first magnetism portion 302d and second magnetism portion 302e.

In the exemplary embodiment, magnetism generated by magnetism unit 302X is used as the strength of stability of compressor body 100. In this manner, the magnetism by magnetism unit 302X is used as the strength of stability of compressor body 100, and thereby it is possible to restore from the tilt of compressor body 100 even when center 301c of curvature of the curved surface is lower than center G of gravity of compressor body 100.

Fifth Exemplary Embodiment

Figure 8:
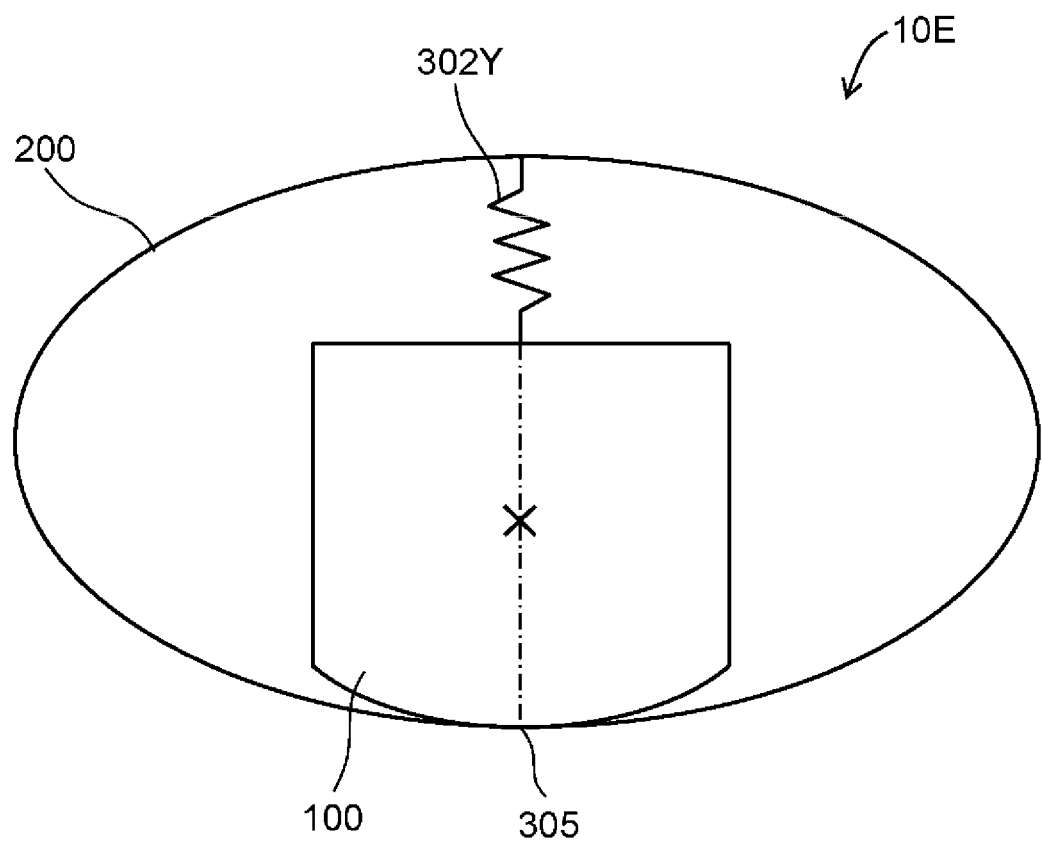
FIG. 8 is a conceptual diagram illustrating changed details of a closed compressor according to a fifth exemplary embodiment of the invention, in a part of the configuration of the closed compressors from the first exemplary embodiment to the third exemplary embodiment.

FIG. 8 is a conceptual diagram illustrating changed details in a part of the configuration of the closed compressors from the first exemplary embodiment to the third exemplary embodiment, in closed compressor 10E according to a fifth exemplary embodiment of the invention.

Closed compressor 10E in FIG. 8 has the same basic configuration as closed compressors 10A to 10C from the first exemplary embodiment to the third exemplary embodiment, and spring unit 302Y which will be described below is added. Spring unit 302Y has a function as the restriction member. FIG. 8 illustrates only a concept of a configuration related to spring unit 302Y, and omits illustration of the other configurations.

In closed compressor 10E in the exemplary embodiment, spring unit 302Y is provided to have one end attached to compressor body 100 and the other end attached to closed vessel 200.

In the exemplary embodiment, a spring force generated by spring unit 302Y is used as the strength of stability of compressor body 100. In this manner, the spring force by spring unit 302Y is used as the strength of stability of compressor body 100, and thereby it is possible to restore from the tilt of compressor body 100 even when center 301c of curvature of the curved surface is lower than center G of gravity of compressor body 100.

Sixth Exemplary Embodiment

Figure 9:
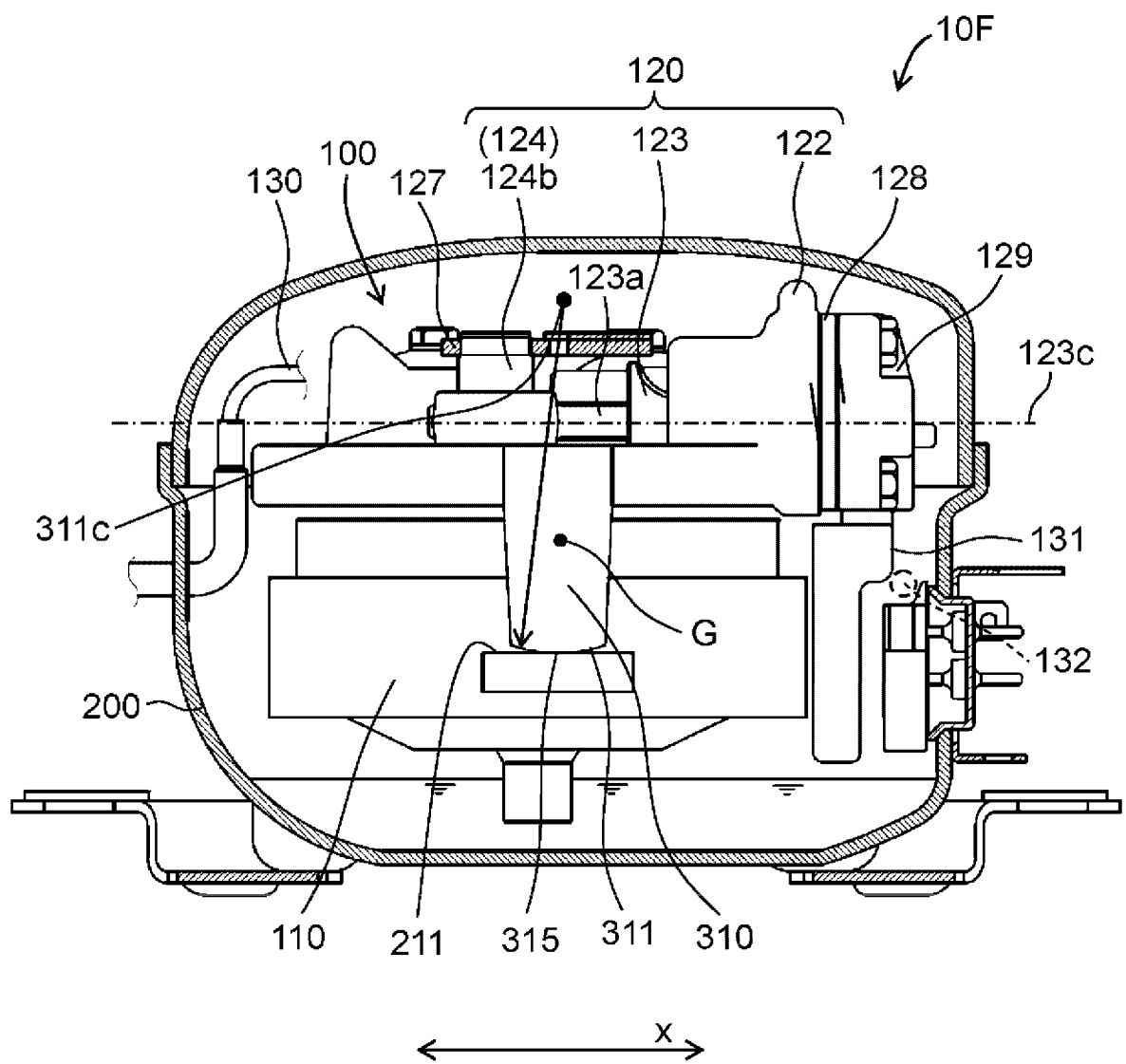
FIG. 9 is a sectional view of a closed compressor according to a sixth exemplary embodiment of the invention.
Figure 10:
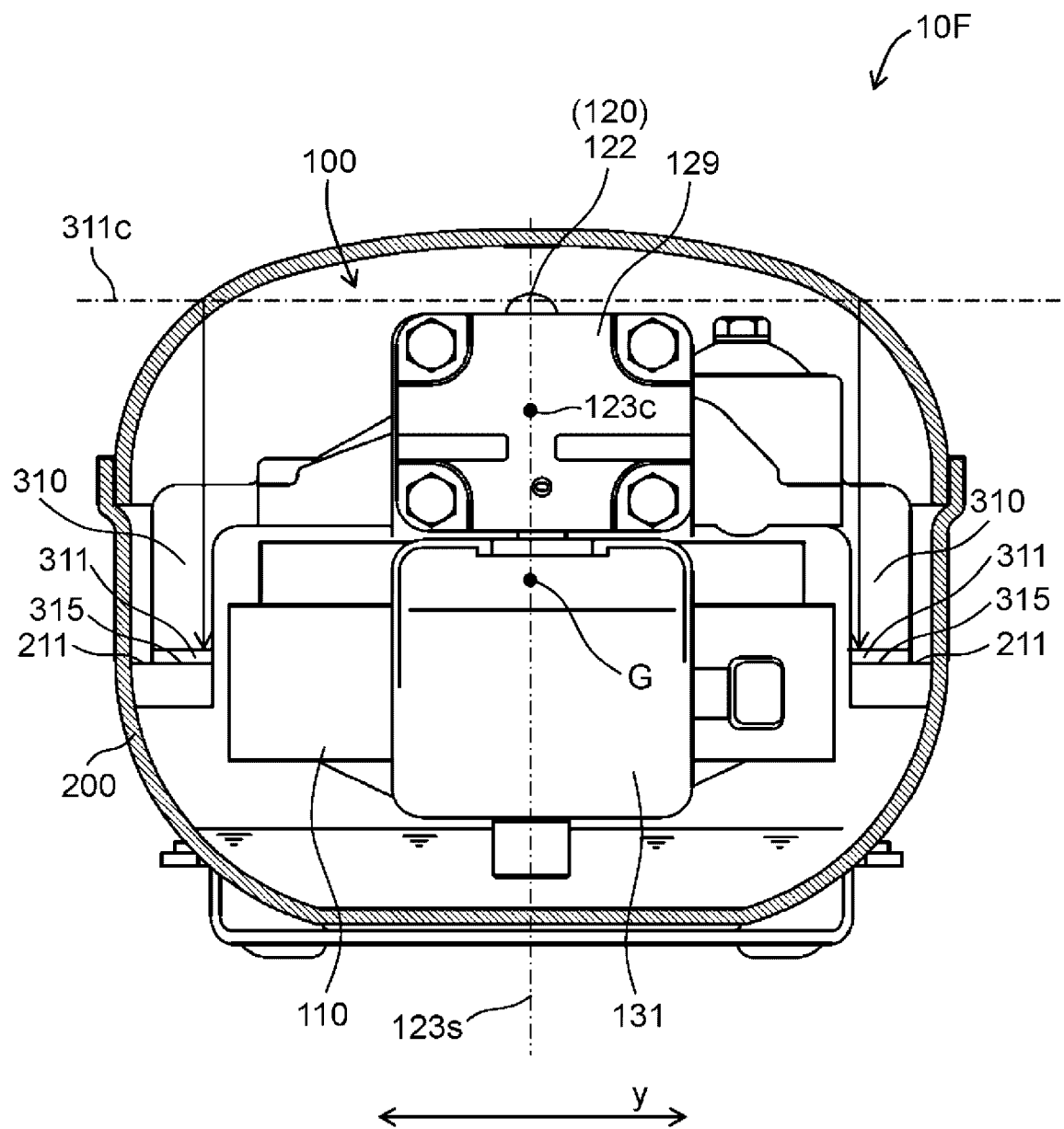
FIG. 10 is a sectional view of the closed compressor of which an orientation is changed by 90 degrees from a state in FIG. 9, according to the sixth exemplary embodiment of the invention.
Figure 11:
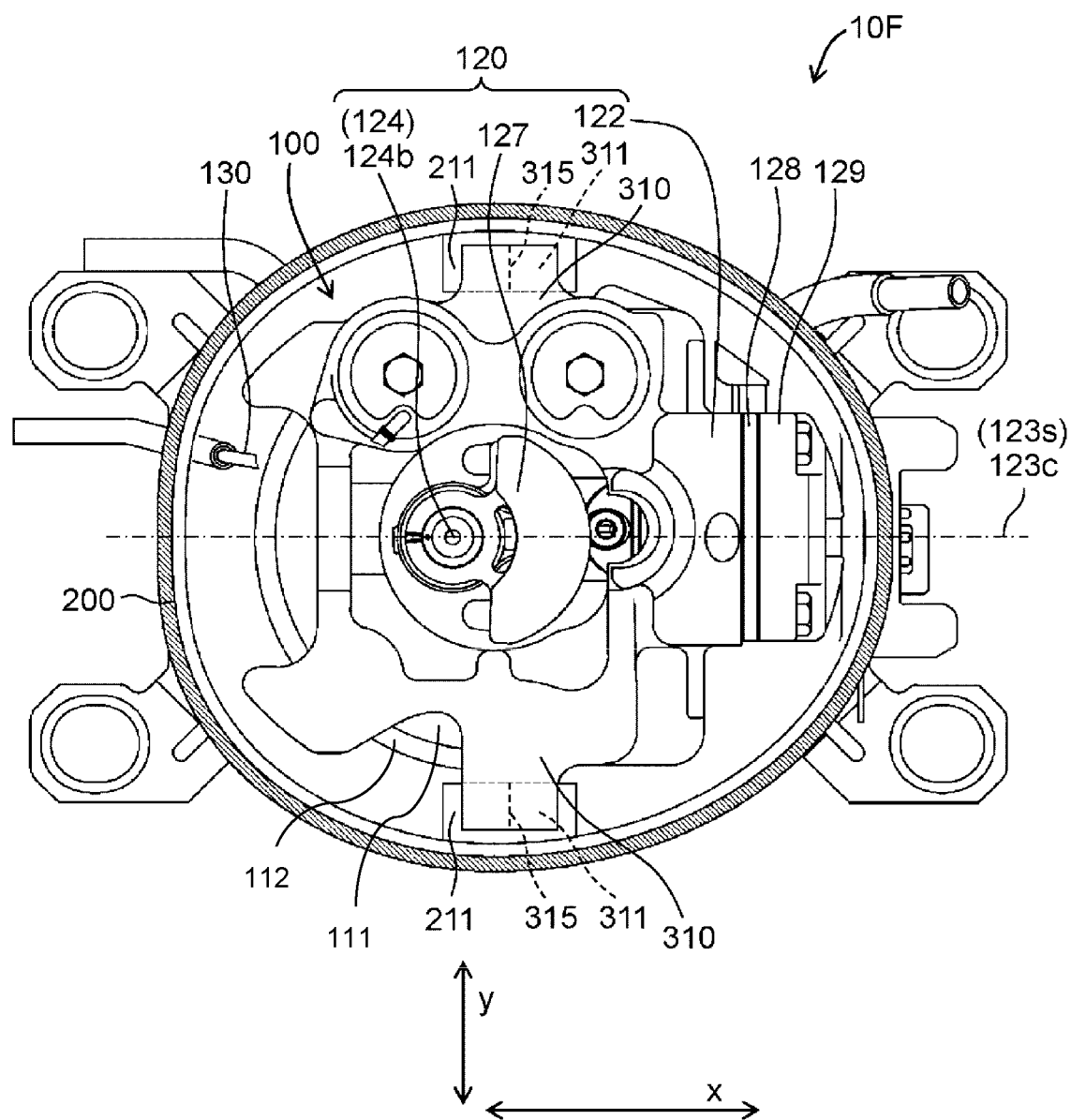
FIG. 11 is a sectional view of the closed compressor according to the sixth exemplary embodiment of the invention when viewed from above.

FIG. 9 is a sectional view of closed compressor 10F according to a sixth exemplary embodiment of the invention, FIG. 10 is a sectional view of closed compressor 10F of which an orientation is changed by 90 degrees from a state in FIG. 9, and FIG. 11 is a sectional view of the same closed compressor 10F when viewed from above.

The same reference marks are assigned to members having the same functions as those in the exemplary embodiments described above, and description thereof is omitted.

A pair of receiving surfaces 211 is provided on inner surfaces on both sides (as illustrated in FIG. 11, both sides with central axis 123c of piston 123 interposed therebetween when viewed in a top view) of closed vessel 200. Receiving surface 211 forms a step in closed vessel 200, and thereby can be integrally formed with the closed vessel.

Compressor body 100 has a pair of supports 310 in which curved surfaces 311 are formed at positions corresponding to receiving surfaces 211 on both side portions of compressor body 100. Support 310 is fixed to cylinder block 122. Similar to the first exemplary embodiment, cylinder block 122 forms bearing 125 that pivotally supports crankshaft 124 (refer to FIG. 1). Support 310 may be a member having strength to withstand a load of compressor body 100. For example, it is possible to use an iron plate pressed material, a resin material formed through injection molding, or the like. In the case of using the iron plate pressed material, manufacturing is easily performed at low costs. In the case of using the resin material, it is possible to reduce collision noises.

Contact portion 315, in which curved surface 311 and receiving surface 211 come into contact with each other, is formed between receiving surface 211 and curved surface 311 formed by support 310.

Contact portions 315 are disposed on both sides from vertical plane 123s containing central axis 123c of piston 123 (refer to FIG. 10).

When a direction of the reciprocating motion of piston 123 is set to an x direction, and a direction orthogonal to the x direction on the horizontal plane is set to a y direction, curved surface 311, on which contact portion 315 is formed, has central axis 311c of curvature in the y direction. As described in the exemplary embodiment, in a case where compressor body 100 has the pair of curved surfaces 311 on both side portions, central axes 311c of curvature of curved surface 311, respectively, are configured to be common.

Curved surface 311 and receiving surface 211 come into line contact with each other, and thereby contact portion 315 is formed. Contact portion 315 is displaced in the x direction due to the vibration (refer to FIGS. 2A and 2B).

As described above, in a state in which curved surface 311 is in contact with receiving surface 211 of closed vessel 200 in contact portion 315, compressor body 100 is independently disposed. In this manner, the vibration of compressor body 100 is unlikely to be transmitted to closed vessel 200, and it is possible to attenuate the vibration of closed compressor 10F.

Here, central axis 311c of curvature of curved surface 311 is configured to have a height higher than or equal to the height of center G of gravity of compressor body 100. Central axis 311c of curvature of curved surface 311 may not necessarily pass vertically above center G of gravity of compressor body 100. Center G of gravity of compressor body 100 is the center of the mass of electric element 110, compression element 120, and support 310, and compression element 120 includes balance weight 127, valve plate 128, cylinder head 129, discharge pipe 130, and suction muffler 131. Discharge pipe 130 is also fixed to closed vessel 200, in addition to compressor body 100, and thus, the mass of the discharge pipe may be subtracted from the mass of compressor body 100.

According to the exemplary embodiment, for example, as in a case where electric element 110 is an outer rotor, it is possible to dispose supports 310 on both side surfaces of closed vessel 200 such that it is possible to achieve miniaturization, light weight, and reduction in costs, even in a case where it is difficult to dispose support 310 on inner bottom 201 of closed vessel 200.

In addition, as in the exemplary embodiment, contact portions 315 are formed at a plurality of positions, curved surface 311 and receiving surface 211 come into line contact with each other, and thereby it is possible to reduce a local load with the configuration in which contact portions 315 are formed. Therefore, it is possible to prevent curved surface 311 from being deformed. Accordingly, it is possible to use a resin material for curved surface 311.

Curved surface 311 may be spherical. Since curved surface 311 is spherical, and thereby a cycle of oscillation of compressor body 100 is constant in any oscillation directions, the oscillation is stable such that it is possible to prevent a collision noise when an operation of closed compressor 10F is stopped. In the case where curved surface 311 is spherical, curved surface 311 and receiving surface 211 come into point contact with each other, and thereby contact portion 315 is formed. Even when contact portions 315 are disposed at the plurality of positions, a shift in the core does not occur, and it is possible to perform stable support.

At least one of curved surface 311 and receiving surface 211 is formed of the resin material, and thereby it is possible to prevent the collision noise from being produced between curved surface 311 and receiving surface 211 in a case where an impact is applied to closed compressor 10F from the outside. A resin buffer member is provided between curved surface 311 and receiving surface 211.

Seventh Exemplary Embodiment

Figure 12:
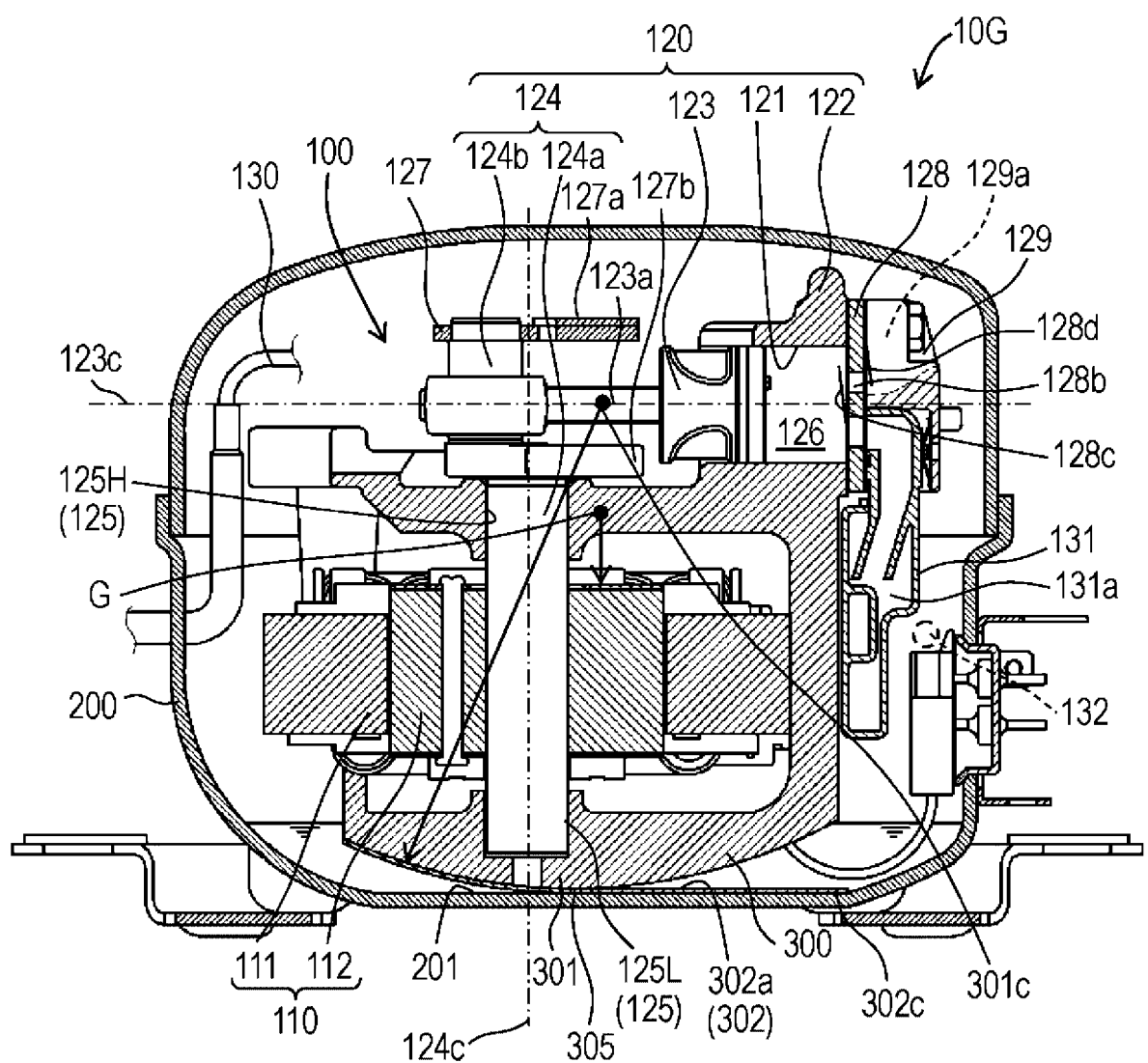
FIG. 12 is a sectional view of a closed compressor according to a seventh exemplary embodiment of the invention.

FIG. 12 is a sectional view of closed compressor 10G according to a seventh exemplary embodiment of the invention.

The same reference marks are assigned to members having the same functions as those in the third exemplary embodiment, and description thereof is omitted.

In closed compressor 10G of the exemplary embodiment, crankshaft 124 is provided with a plurality of balance weights 127a and 127b on which a centrifugal force acts. Balance weights 127a and 127b are attached to crankshaft 124, or are integrally formed with crankshaft 124. In the exemplary embodiment, balance weight 127a is provided on eccentric shaft 124b of crankshaft 124, and balance weight 127b is integrally formed with a crank arm.

Balance weight 127a is disposed above a horizontal plane containing central axis 123c of piston 123, and balance weight 127b is disposed below the horizontal plane containing central axis 123c of piston 123.

Figure 13:
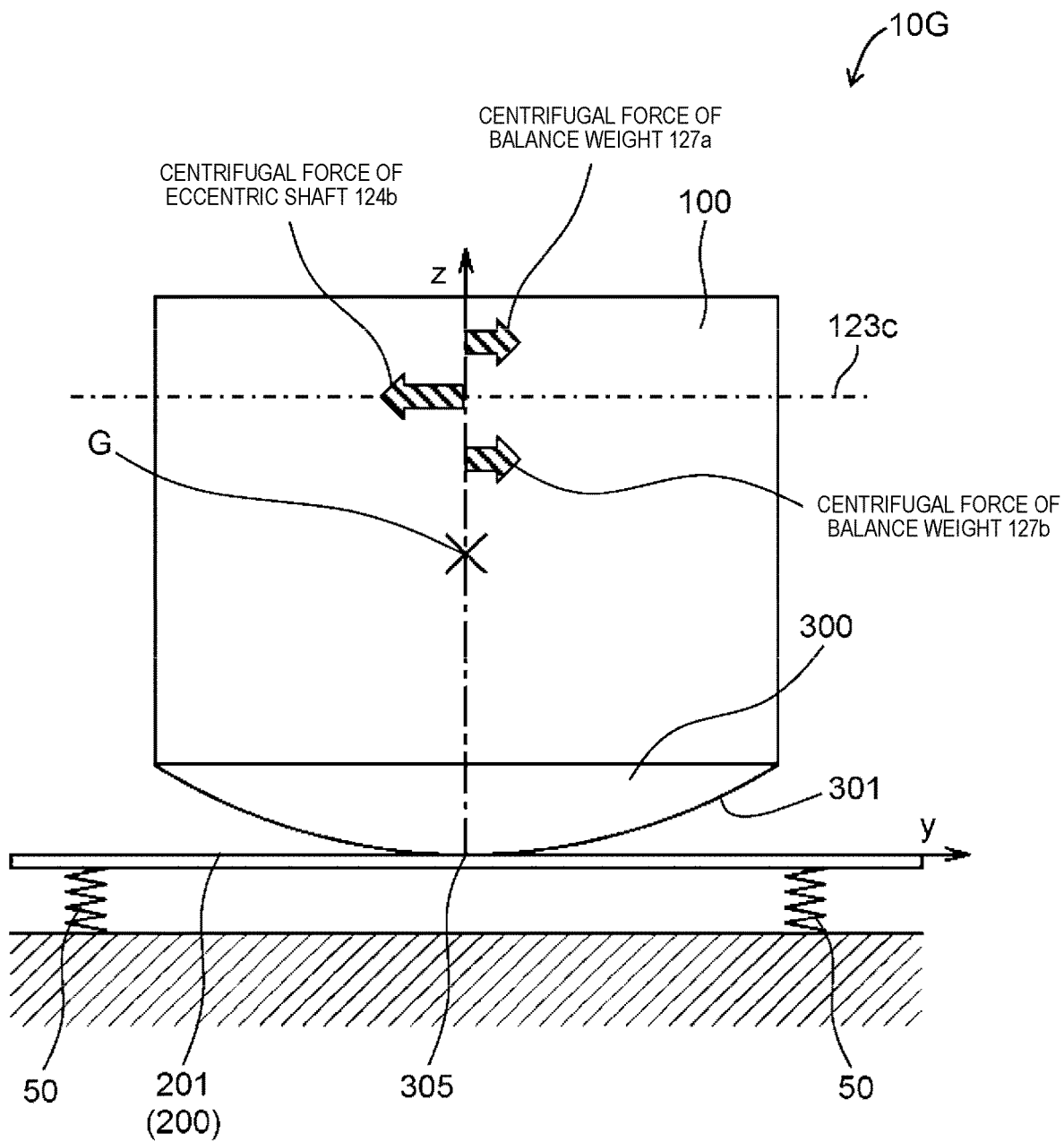
FIG. 13 is a diagram illustrating a centrifugal force acting on a compressor body according to the seventh exemplary embodiment of the invention.

FIG. 13 is a diagram illustrating a centrifugal force acting on compressor body 100 according to the seventh exemplary embodiment of the invention.

FIG. 13 illustrates a state in which compressor body 100 is mounted on inner bottom 201 as the receiving surface of closed vessel 200, and closed vessel 200 is elastically supported by elastic member 50.

In FIG. 13, a direction of the reciprocating motion of piston 123 is set to an x direction, a direction orthogonal to the x direction on a horizontal plane is set to a y direction, and a direction (vertical direction) orthogonal to the x direction on a vertical plane is set to a z direction.

Centrifugal forces of balance weight 127a, balance weight 127b, and eccentric shaft 124b are balanced, and thereby rotational vibration due to unbalance of compression element 120 is more reliably reduced such that it is possible to achieve low vibration.

Eighth Exemplary Embodiment

Figure 14:
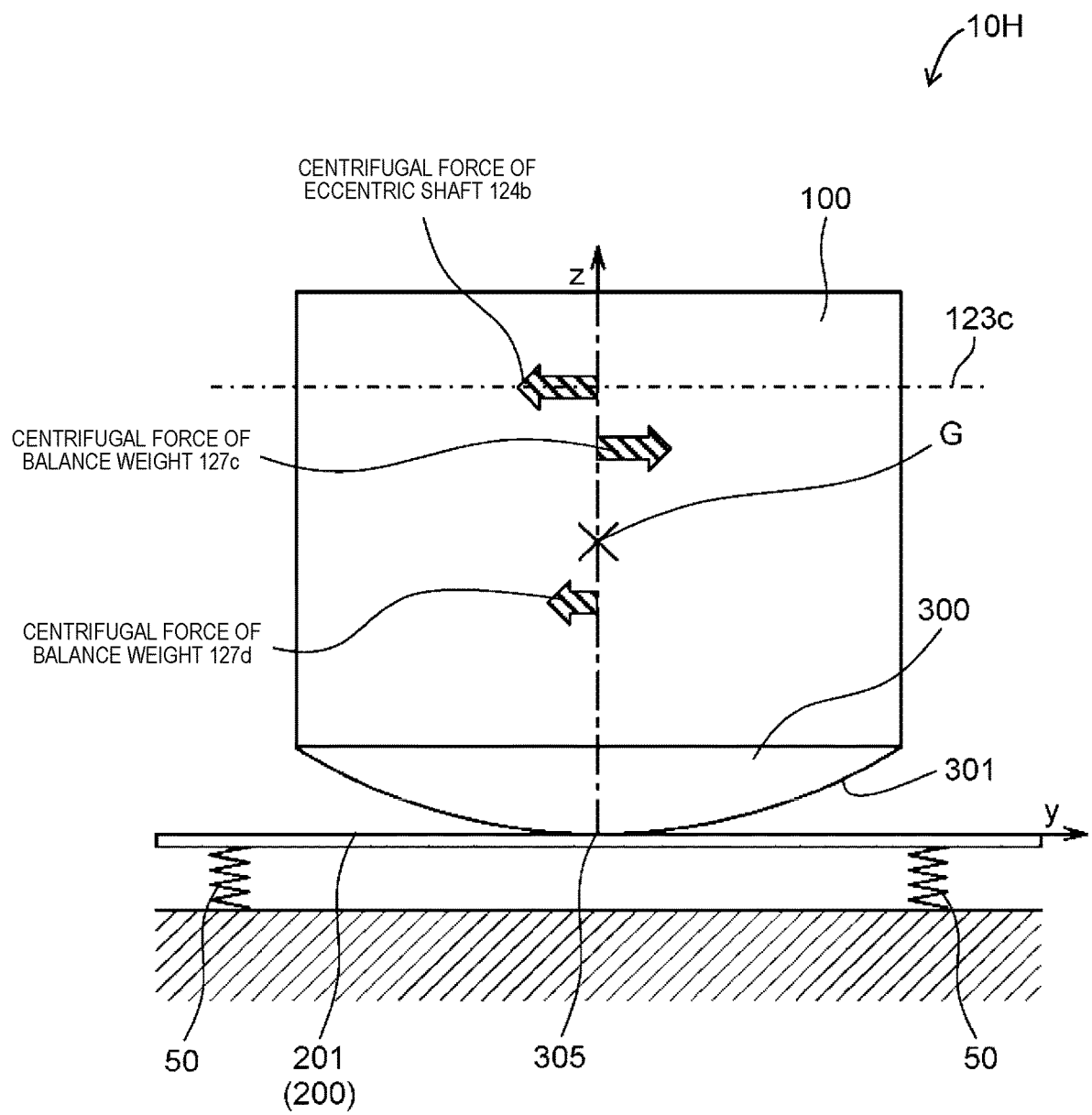
FIG. 14 is a diagram illustrating a centrifugal force acting on a compressor body of a closed compressor according to an eighth exemplary embodiment of the invention.

FIG. 14 is a diagram illustrating the centrifugal force acting on compressor body 100 of closed compressor 10I1 according to an eighth exemplary embodiment of the invention.

In closed compressor 10I1 illustrated in FIG. 14, the balance weight is disposed at a changed position, compared to the seventh exemplary embodiment, and the other configurations are the same as that in the seventh exemplary embodiment, and thus description thereof is omitted.

In the exemplary embodiment, balance weights 127c and 127d are disposed only below the horizontal plane containing central axis 123c of piston 123. For example, in the exemplary embodiment, balance weight 127c is integrally formed with the crank arm, and balance weight 127d is attached to an end surface of rotor 112.

Centrifugal forces of balance weight 127c, balance weight 127d, and eccentric shaft 124b are balanced, and thereby it is possible to more reliably reduce rotational vibration due to unbalance of compression element 120 such that it is possible to achieve low vibration.

Ninth Exemplary Embodiment

Figure 15:
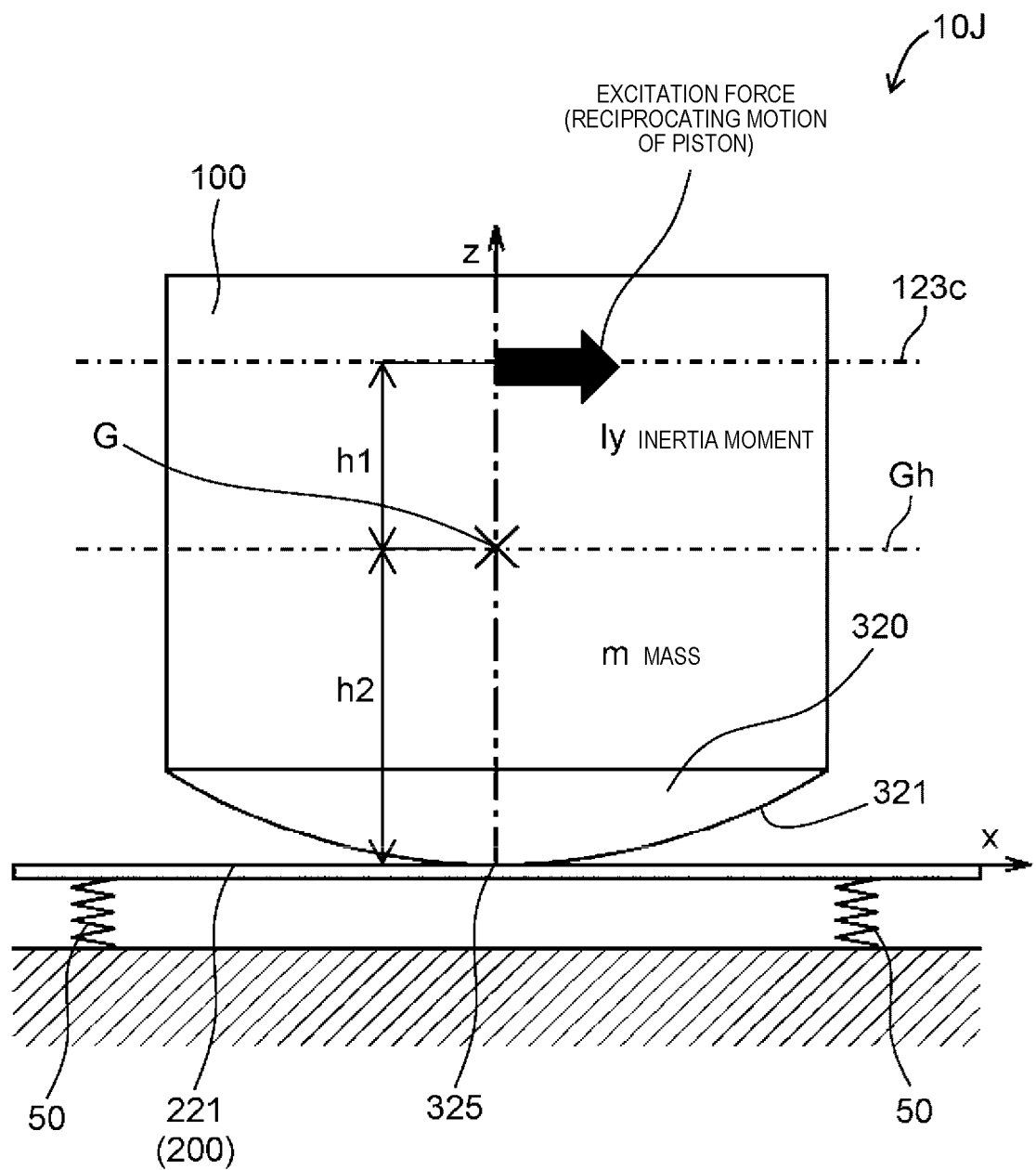
FIG. 15 is a diagram illustrating a closed compressor according to a ninth exemplary embodiment of the invention.

FIG. 15 is a diagram illustrating closed compressor 10J according to a ninth exemplary embodiment of the invention.

FIG. 15 illustrates a state in which compressor body 100 is mounted on receiving surface 221 of closed vessel 200 in closed compressor 10J, and closed vessel 200 is elastically supported by elastic member 50. Curved surface 321 is formed in support 320 in compressor body 100. Curved surface 321 and receiving surface 221 come into contact with each other in contact portion 325.

In FIG. 15, a direction of the reciprocating motion of piston 123 is set to an x direction, a direction orthogonal to the x direction on a horizontal plane is set to a y direction, and a direction orthogonal to the x direction on a vertical plane is set to a z direction.

A distance from horizontal plane Gh containing center G of gravity to central axis 123c of piston 123 is represented by h1, a distance from horizontal plane Gh containing center G of gravity to contact portion 325 of support 320 is represented by h2, the moment of inertia around the y direction is represented by Iy, and the mass of compressor body 100 is represented by m. At this time, $Iy/(mh1h2)$ is 0.7 to 1.3, and thereby it is possible to approximate the center of an impact to an adjacent rotating center with a force generated from compression element 120. Accordingly, it is possible to reduce an occurrence of vibration in the x direction, based on the center of the impact such that it is possible to achieve low vibration.

When acceleration in the x direction on horizontal plane Gh is set to first acceleration, and acceleration in the y direction in contact portion 325 of support 320 is set to second acceleration, support 320 is disposed such that the second acceleration is lower than or equal to one fifth of the first acceleration. In this manner, it is possible to obtain 0.7 to 1.3 from $Iy/(mh1h2)$.

It is possible to apply the configuration of the exemplary embodiment to all of the other exemplary embodiments.

Balance weight 127 is disposed such that the second acceleration is lower than or equal to one fifth of the first acceleration, and thereby it is possible to more reliably reduce the vibration in the y direction due to the unbalance of compression element 120, and further it is possible to achieve low vibration.

For example, when mass m of compressor body 100 is 400 g, the mass of piston 123 is 40 g, and amplitude of piston 123 is 18 mmP-P, amplitude of compressor body 100 is 0.18 mmP-P in the vicinity of piston 123 from a mass ratio, and is 0.10 mmP-P in the vicinity of center G of gravity. In general, the amplitude of compressor is desirably 0.02 mmP-P or lower. Hence, the amplitude is 0.02 mmP-P or lower in contact portion 325, and thereby it is possible to have 0.02 mmP-P or lower of the amplitude of the compressor.

In order to have the amplitude of 0.02 mmP-P or lower of in contact portion 325 with respect to the amplitude of 0.10 mmP-P in the vicinity of center G of gravity, the amplitude in contact portion 325 may be one fifth of the amplitude in the vicinity of center G of gravity.

When a waveform of the vibration is considered as a sine wave, the acceleration is also one fifth when the vibration width is one fifth. Therefore, acceleration in the x direction in the vicinity of contact portion 325 and the y direction may be lower than or equal to one fifth of acceleration in the x direction in the vicinity of center G of gravity.

Tenth Exemplary Embodiment

Figure 16:
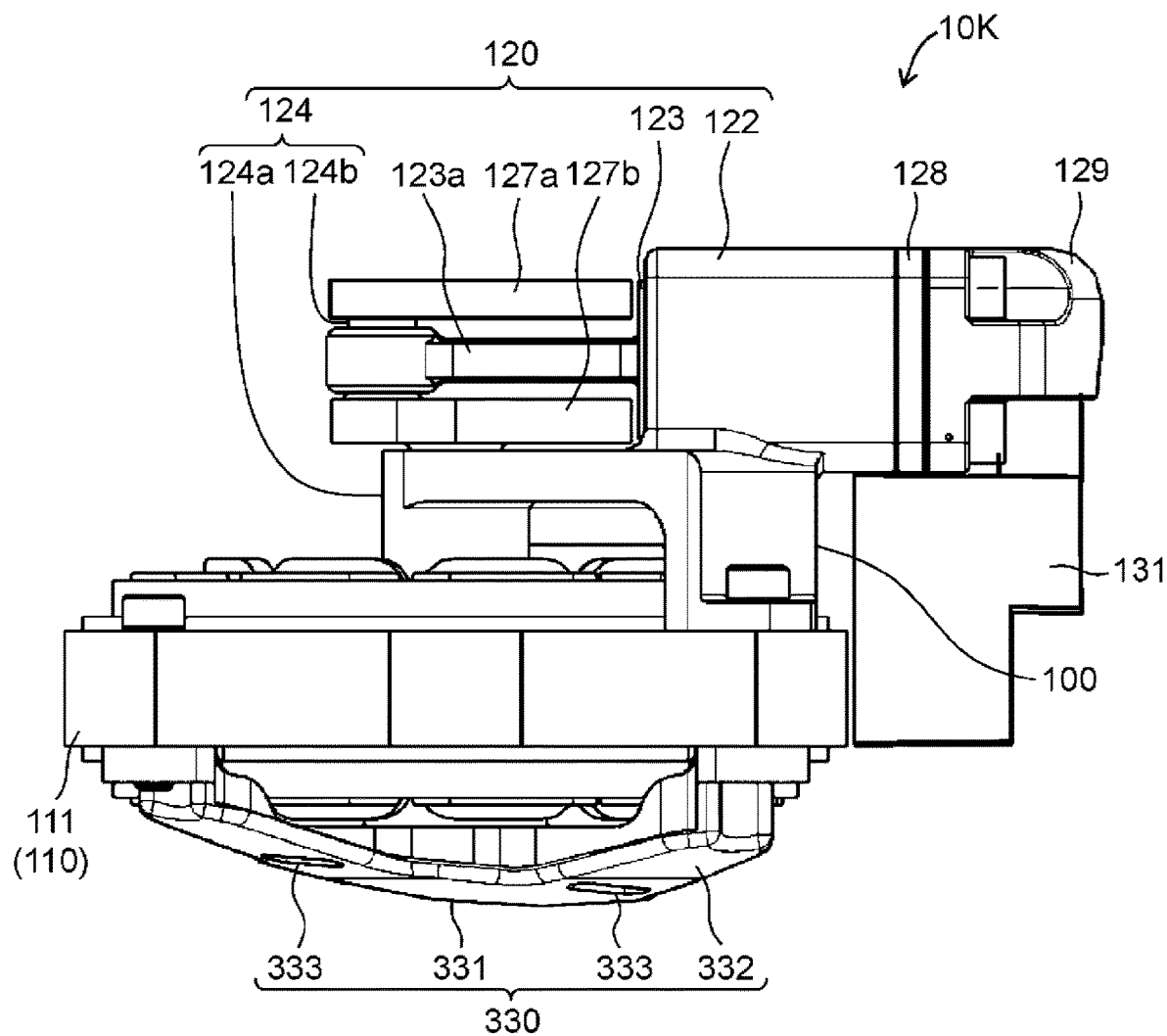
FIG. 16 is a side view of main parts of a closed compressor according to a tenth exemplary embodiment of the invention.
Figure 17:
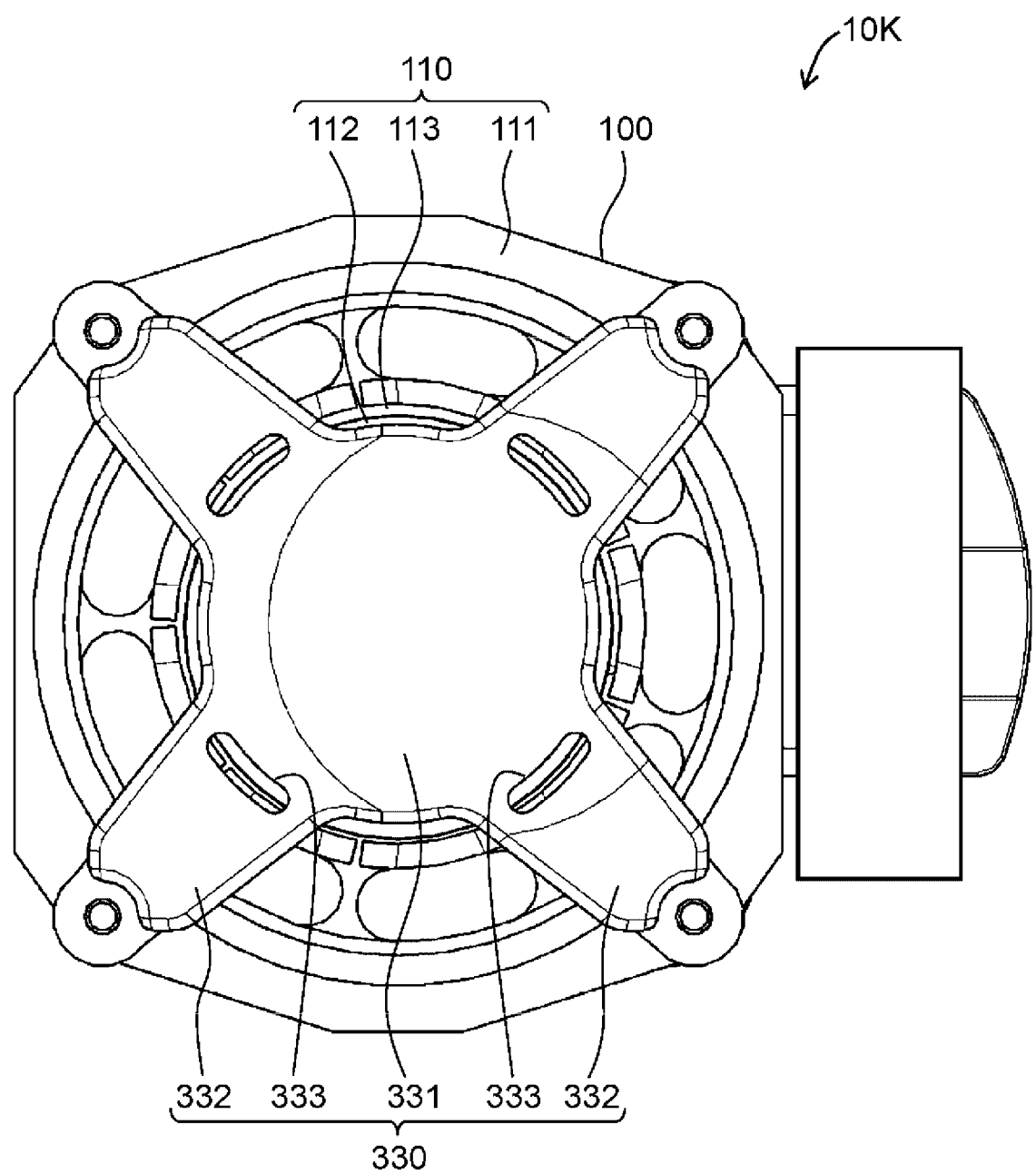
FIG. 17 is a bottom view of main parts of the closed compressor according to the tenth exemplary embodiment of the invention.

FIG. 16 is a side view of main parts of closed compressor 10K according to a tenth exemplary embodiment of the invention, and FIG. 17 is a side view of main parts of closed compressor 10K.

The same reference marks are assigned to members having the same functions as those in the seventh exemplary embodiment, and description thereof is omitted. In addition, FIGS. 16 and 17 illustrate only a part of compressor body 100, because closed vessel 200 and the other configurations are the same as those in the other exemplary embodiments.

In closed compressor 10K in the exemplary embodiment, support 330 is attached to the bottom surface of stator 111 of electric element 110.

Support 330 has curved surface 331, a plurality of legs 332, and an opening 333. Curved surface 331 is attached to the bottom surface of stator 111 by using legs 332.

Electric element 110 has rotor 112, stator 111, and ring-shaped clearance 113 provided between rotor 112 and stator 111.

Support 330 has opening 333 through which a jig is able to be inserted into clearance 113, at a position facing clearance 113. As the jig, for example, a clearance gauge is inserted into clearance 113 from opening 333, and thereby it is possible to secure assembly properties of electric element 110 such that it is possible to dispose support 330 on the lower side of compressor body 100.

As described in the exemplary embodiment, in a case where rotor 112 is disposed on an inner diameter side of stator 111, it is possible to fix support 330 via stator 111 such that a structure of support 330 is simplified, and it is possible to reduce manufacturing costs.

Eleventh Exemplary Embodiment

Figure 18:
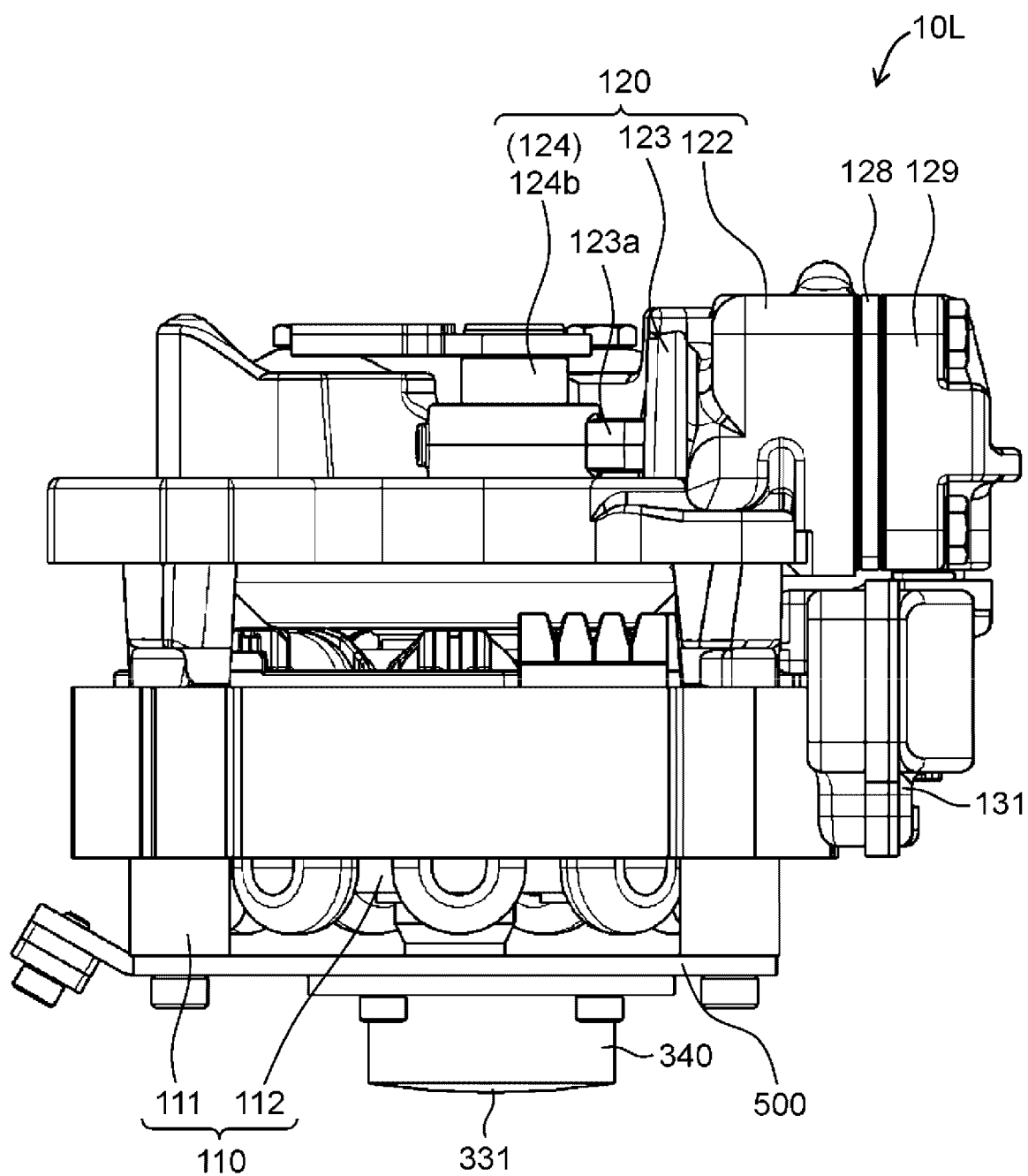
FIG. 18 is a side view of main parts of a closed compressor according to an eleventh exemplary embodiment of the invention.
Figure 19:
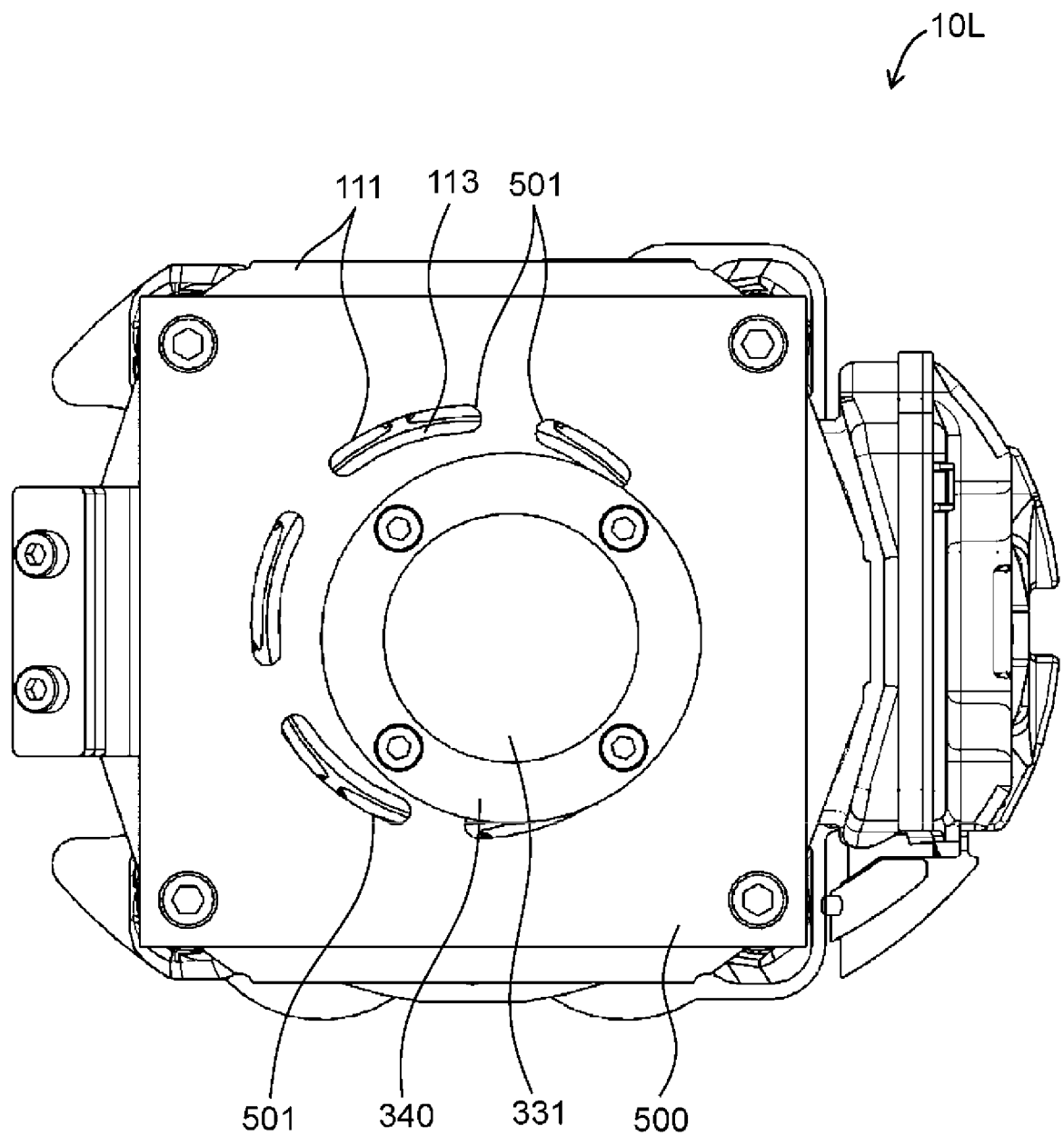
FIG. 19 is a bottom view of main parts of the closed compressor according to the eleventh exemplary embodiment of the invention.
Figure 20:
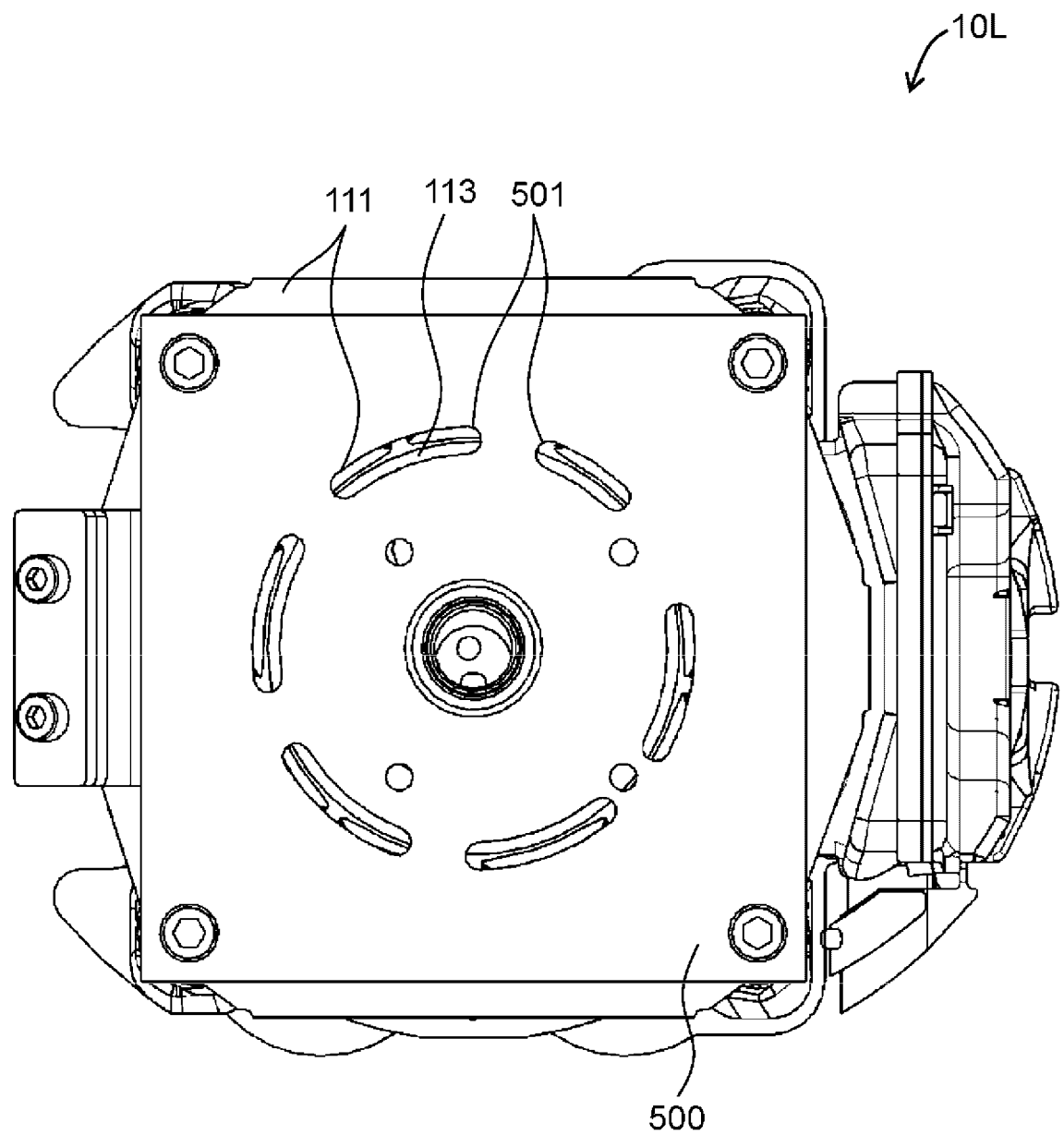
FIG. 20 is a bottom view of main parts of the closed compressor showing a state in which a support is removed from a configuration in FIG. 19, according to the eleventh exemplary embodiment of the invention.

FIG. 18 is a side view of main parts of closed compressor 10L according to an eleventh exemplary embodiment of the invention, FIG. 19 is a bottom view of main parts of closed compressor 10L, and FIG. 20 is a bottom view of the main parts of the same closed compressor 10L in a state in which the support is removed from the configuration in FIG. 19.

The same reference marks are assigned to members having the same functions as those in the seventh exemplary embodiment, and description thereof is omitted. In addition, FIGS. 18 to 20 illustrate only a part of compressor body 100, because closed vessel 200 and the other configurations are the same as those in the other exemplary embodiments.

In closed compressor 10L of the exemplary embodiment, support 340 is attached to the bottom surface of stator 111 of electric element 110 via auxiliary member 500.

Curved surface 331 is formed on the bottom surface of support 340.

Electric element 110 has rotor 112, stator 111, and ring-shaped clearance 113 formed between rotor 112 and stator 111.

Auxiliary member 500 has opening 501 through which a jig is able to be inserted into clearance 113, at a position facing clearance 113. In this manner, as the jig, for example, it is possible to insert a clearance gauge into clearance 113 from opening 501, and thus it is possible to secure assembly properties of electric element 110 such that it is possible to dispose support 340 on the lower side of compressor body 100.

Twelfth Exemplary Embodiment

Figure 21:
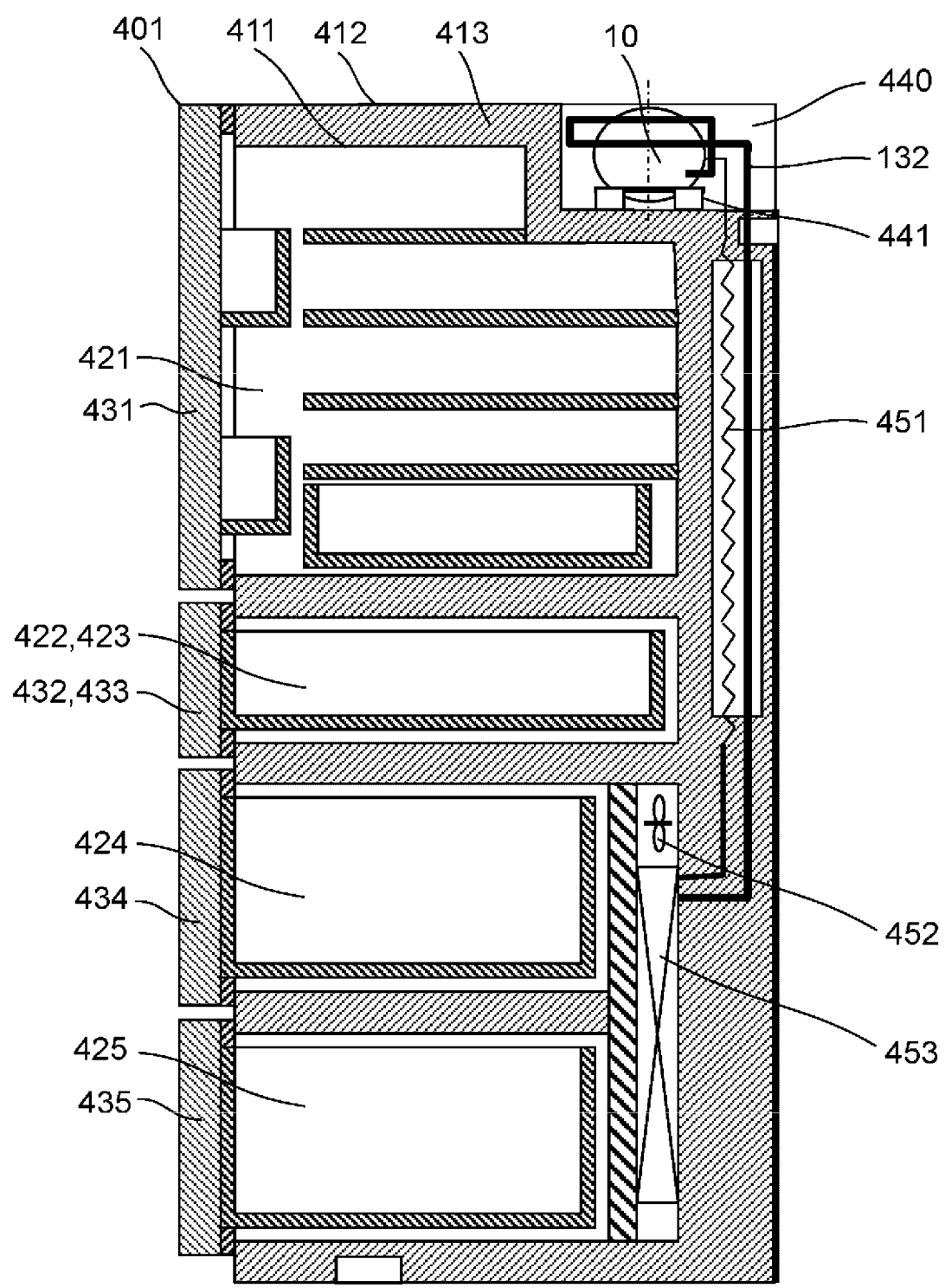
FIG. 21 is a configurational diagram schematically illustrating a refrigeration device according to a twelfth exemplary embodiment of the invention, which uses the closed compressor from the first exemplary embodiment to the eleventh exemplary embodiment.
Figure 22:
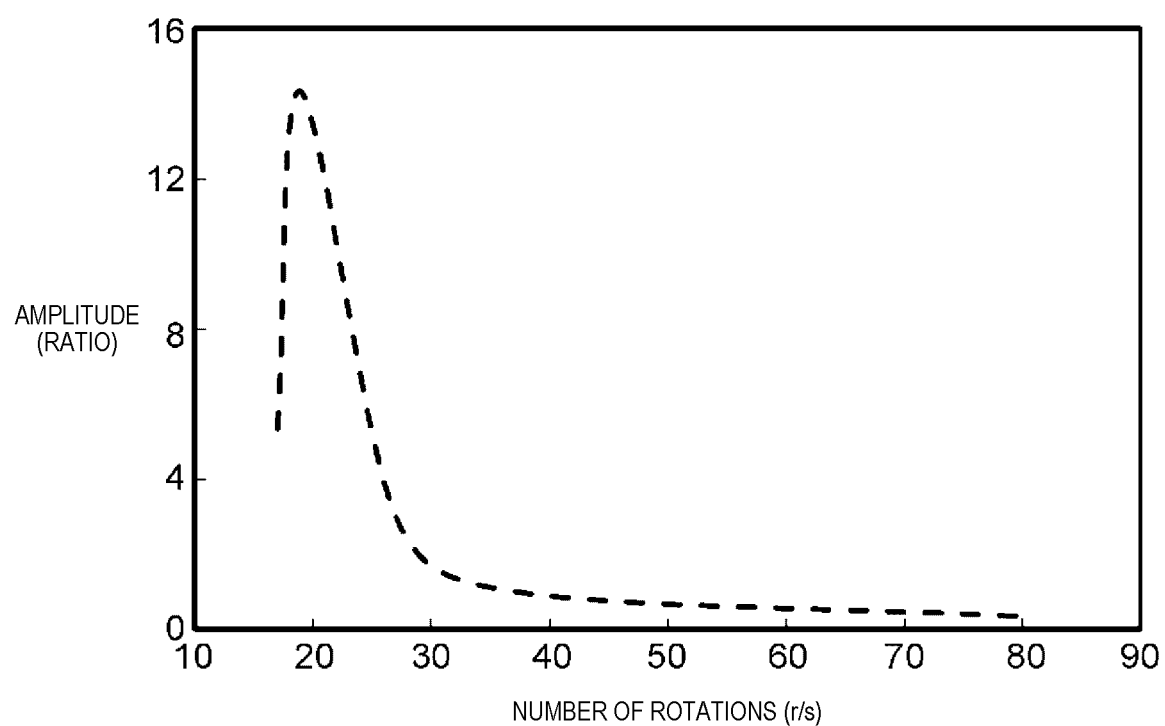
FIG. 22 is a characteristic graph illustrating a relationship between the number of rotations and a vibration ratio in a case where a compressor in the related art uses, as the elastic support member, a spring which is often used.

FIG. 21 is a configurational diagram schematically illustrating a refrigeration device using closed compressor 10 according to a twelfth exemplary embodiment of the invention, which uses the closed compressor from the first exemplary embodiment to the eleventh exemplary embodiment.

In the twelfth exemplary embodiment, a use of the refrigerator as an example of refrigeration device is described.

Thermal insulation box 401 has a thermal insulation wall. The thermal insulation wall is formed by injecting thermal insulator 413, with which foam filling is performed, into a space between inner box 411 and outer box 412. Inner box 411 is formed through vacuum forming with a resin material such as ABS. Outer box 412 is formed using a metal material such as a precoated steel plate. A material selected, for example, from rigid urethane foam, phenol foam, styrene foam, and the like is used as a material of thermal insulator 413. When hydrocarbon-based cyclopentane is used as a foam material, better effects may be expected in terms of prevention of warming.

The inside of thermal insulation box 401 is divided into a plurality of insulation zones, an upper insulation zone has a type of rotation door, and a lower insulation zone has a type of drawer. The upper insulation zone is cooling compartment 421, the middle zone is switching compartment 422, ice compartment 423, and vegetable compartment 424, and the lower zone is refrigeration compartment 425.

Cooling compartment 421 is provided with cooling-compartment rotation door 431, switching compartment 422 is provided with switching-compartment drawing door 432, ice compartment 423 is provided with ice-compartment drawing door 433, vegetable compartment 424 is provided with vegetable-compartment drawing door 434, and refrigeration compartment 425 is provided with refrigeration-compartment drawing door 435, via gaskets, respectively.

In addition, a recessed portion 440 is formed with a rear side on the top surface being recessed in thermal insulation box 401. Closed compressor 10 is disposed in recessed portion 440. Closed compressor 10 is mounted on recessed portion 440 via elastic support member 441.

A refrigeration cycle is configured by connecting, in an annular shape, closed compressor 10, a condenser (not illustrated) provided on a side or the like of thermal insulation box 401, capillary 451 as a decompressor, a dryer (not illustrated) that removes water, evaporator 453 provided in the vicinity of cooling fan 452, and suction pipe 132.

Hereinafter, operations and effects of the refrigerator having such a configuration described above will be described.

First, temperature setting and cooling methods of thermal insulation zones are described.

Cooling compartment 421 is set at 1 to 5° C. so as to maintain a cooling state.

It is possible for a user to change temperature setting of switching compartment 422, and it is possible to set a predetermined temperature from temperature of a refrigeration compartment to temperature of the cooling and the vegetable compartment.

Ice compartment 423 is an independent ice storage compartment, is provided with an automatic ice making machine (not illustrated), and automatically makes and stores ice. Since ice compartment 423 aims to store ice, the ice compartment is set at a freezing temperature of −18° C. to −10° C. which is relatively higher than a freezing temperature zone.

Vegetable compartment 424 is set at 2° C. to 7° C. slightly higher or equal to cooling compartment 421. It is possible to maintain freshness of leafy vegetables for a long time, as temperature is low to the extent that freezing is not performed.

Refrigeration compartment 425 is set at −22 to −18° C. normally for maintaining refrigeration; however, in order to improve a refrigeration maintaining state, the temperature is set to, for example, a low temperature of −30 to −25° C.

In order to efficiently maintain different temperature settings, the compartments are divided with the thermal insulation walls; however, it is possible to perform the foam filling with thermal insulator 413 integrally with the refrigerator as a method of reducing costs and improving the thermal insulation performance. Since thermal insulator 413 has the thermal insulation performance about two times an insulation member such as styrofoam, it is possible to increase an accommodation volume by having thin partitions.

Next, an operation of the refrigeration cycle will be described.

A refrigeration operation in the refrigerator is started and stopped in response to a signal from a temperature sensor (not illustrated) and a control board, depending on the set temperature in the refrigerator. When the refrigeration operation is started, closed compressor 10 performs a compression operation, a high-temperature and high-pressure refrigerant gas discharged from closed compressor 10 is subjected to heat dissipation so as to be condensed to be liquefied in the condenser (not illustrated), then is depressurized in capillary 451 to become a low-temperature and low-pressure liquid refrigerant, and reaches evaporator 453.

The operation of cooling fan 452 causes the refrigerant gas in evaporator 453 to be subjected to heat exchange with air in the refrigerator and to be subjected to evaporation. On the other hand, cold air at a low temperature, which has been subjected to heat exchange with the refrigerant gas, is distributed to a damper (not illustrated) or the like. Cooling of the compartments is performed by the operations described above.

As closed compressor 10 of the refrigerator which performs the operations described above, any one of closed compressors 10A to 10L (collectively referred to as closed compressor 10) of the first exemplary embodiment to the eleventh exemplary embodiment of the invention is mounted, and thereby, particularly, it is possible to significantly reduce an occurrence of vibration of closed compressor 10 during slow rotations. As a result, it is possible to reduce noise and vibration of the refrigerator. Further, since it is possible to operate closed compressor 10 at a lower number of rotations, it is possible to reduce power consumption of the refrigerator.

As described in the exemplary embodiment, in the refrigerator that is provided with closed compressor 10 disposed on the upper side thereof, closed compressor 10 is positioned to be close to an ear when a person stands.

In particular, when closed compressor 10 operates at slow rotations, a problem arises in that vibration is likely to propagate to the refrigerator. However, any one of closed compressors 10A to 10L of the first exemplary embodiment to the eleventh exemplary embodiment of the invention is mounted, and thereby it is possible to significantly reduce the occurrence of vibration of closed compressors 10A to 10L during slow rotations such that it is possible to reduce noises and vibration of the refrigerator.

As described above, according to the exemplary embodiment, the refrigerator provided with closed compressor 10 on the upper side thereof can further exhibit an effect of noise reduction.

Note that it is difficult to transmit the vibration to the floor even when closed compressor 10 is disposed on the lower side of the refrigerator, and thus a high effect of noise reduction is achieved.

The first exemplary embodiment to the eleventh exemplary embodiment are described to use electric element 110 in which rotor 112 is disposed on the inner diameter side of stator 111; however, it is possible to realize a configuration in which electric element 110, in which rotor 112 is disposed on the outer diameter side of stator 111, is used, and thereby inertia increases, rotation is stabilized at the slow rotations, and high efficiency is achieved at the slow rotations.

As described above, the closed compressor according to a first aspect of the disclosure includes: the compressor body; and the closed vessel in which the compressor body is accommodated and oil is stored. The compressor body has the electric element and the compression element that is driven by the electric element. The compression element has the cylinder block that forms the cylinder, the piston that performs the reciprocating motion in the cylinder, and the crankshaft that actuates the piston. The cylinder block configures the bearing that pivotally supports the crankshaft. The cylinder forms the compression chamber. The compressor body has the support that forms the curved surface. The contact portion, at which the curved surface comes into contact with the receiving surface in the closed vessel, is formed.

In this configuration, since the compressor body is independently disposed in closed vessel with the contact portion, the vibration of the compressor body is unlikely to be transmitted to the closed vessel, and it is possible to attenuate the vibration of the closed compressor.

According to a second aspect of this disclosure, in the closed compressor according to the first aspect, the curved surface is formed in a lower portion of the compressor body, and the receiving surface is an inner bottom of the closed vessel.

In this configuration, it is possible to independently dispose the compressor body on the inner bottom of the closed vessel.

According to a third aspect of this disclosure, in the closed compressor according to the second aspect, the contact portion is disposed vertically below the center of gravity of the compressor body.

In this configuration, since the compressor body is independently disposed at a predetermined posture, the tilt of the compressor body is reduced, and thus it is possible to prevent a portion other than the support from colliding with the closed vessel such that it is possible to reduce transmission of the vibration of the compressor body to the closed vessel.

According to a fourth aspect of this disclosure, in the closed compressor according to any one of the first to third aspects, the curved surface is configured of a spherical surface.

In this configuration, since the cycle of the oscillation of the compressor body is constant in any oscillation directions, the oscillation is stable such that it is possible to prevent a collision noise between the compressor body and the closed vessel when the operation of the closed compressor is stopped.

According to a fifth aspect of this disclosure, in the closed compressor according to any one of the first to fourth aspects, the height of the center of curvature of the curved surface is higher than or equal to the height of the center of gravity of the compressor body.

In this configuration, strength of stability acts on only by the mass of the compressor body.

According to a sixth aspect of this disclosure, in the closed compressor according to any one of the first to third aspects and the fifth aspect, the curved surface has at least a first curved surface and a second curved surface, and the first curved surface and the second curved surface have the centers of curvature at positions which are different from each other.

In this configuration, the compressor body is likely to oscillate in the reciprocating direction of the piston, and thereby the vibration due to the reciprocating motions of the piston can be unlikely to be transmitted to the outside.

According to a seventh aspect of this disclosure, in the closed compressor according to any one of the first to third aspects, the fifth aspect, and the sixth aspect, when a direction of the reciprocating motion of the piston is set to an x direction, and a direction orthogonal to the x direction on a horizontal plane is set to a y direction, the curved surface has the central axis of curvature in the y direction.

In this configuration, the compressor body is likely to oscillate in the reciprocating direction of the piston, and thereby the vibration due to the reciprocating motions of the piston can be unlikely to be transmitted to the outside. In addition, since it is possible to reduce a local load, it is possible to prevent the curved surface from being deformed such that it is possible to use the resin material for the curved surface.

According to an eighth aspect of this disclosure, in the closed compressor according to any one of the first to third aspects and the fifth to seventh aspects, the contact portion is provided at one position, and the curved surface and the receiving surface come into line contact with each other, and thereby the contact portion is formed.

In this configuration, the compressor body is likely to oscillate in the reciprocating direction of the piston, and thereby the vibration due to the reciprocating motions of the piston can be unlikely to be transmitted to the outside. In addition, since it is possible to reduce the local load, it is possible to prevent the curved surface from being deformed such that it is possible to use the resin material for the curved surface.

According to a ninth aspect of this disclosure, in the closed compressor according to any one of the first to eighth aspects, the contact portion is provided at one position, and the contact portion is disposed on the cylinder side from the center of a rotation axis of the crankshaft.

In this configuration, there is no need to adjust the center of gravity such that reduction in costs is achieved.

According to a tenth aspect of this disclosure, in the closed compressor according to any one of the first to seventh aspects, the contact portions are provided at a plurality of positions, and a plurality of the contact portions are disposed on both sides from the vertical plane containing the central axis of the piston.

In this configuration, as in the case where the electric element is the outer rotor, it is possible to dispose the supports on both side surfaces of the closed vessel such that it is possible to achieve miniaturization, light weight, and reduction in costs, even in the case where it is difficult to dispose the support on the inner bottom of the closed vessel.

According to an eleventh aspect of this disclosure, in the closed compressor according to any one of the first to seventh aspects, the contact portions are provided at the plurality of positions, and, when the direction of the reciprocating motion of the piston is set to the x direction, the plurality of contact portions are each provided to be able to displace in the x direction.

In this configuration, as in the case where the electric element is the outer rotor, it is possible to dispose the supports on both side surfaces of the closed vessel such that it is possible to achieve miniaturization, light weight, and reduction in costs, even in the case where it is difficult to dispose the support on the inner bottom of the closed vessel.

According to a twelfth aspect of this disclosure, in the closed compressor according to any one of the first to sixth aspects, the contact portions are provided at the plurality of positions, and, when the direction of the reciprocating motion of the piston is set to the x direction, and the direction orthogonal to the x direction on the horizontal plane is set to the y direction, a plurality of curved surfaces, on which the contact portions are formed, have a common central axis of curvature in the y direction.

In this configuration, as in the case where the electric element is the outer rotor, it is possible to dispose the supports on both side surfaces of the closed vessel such that it is possible to achieve miniaturization, light weight, and reduction in costs, even in the case where it is difficult to dispose the support on the inner bottom of the closed vessel.

According to a thirteenth aspect of this disclosure, in the closed compressor according to any one of the first to seventh aspects, the contact portions are provided at the plurality of positions, and the curved surfaces and the receiving surfaces come into line contact with each other, and thereby the plurality of contact portions are formed, respectively.

In this configuration, since it is possible to reduce the local load, it is possible to prevent the curved surface from being deformed such that it is possible to use the resin material for the curved surface.

According to a fourteenth aspect of this disclosure, in the closed compressor according to any one of the first to seventh aspects, the contact portions are provided at the plurality of positions, and the curved surfaces and the receiving surfaces come into point contact with each other, and thereby the plurality of contact portions are formed, respectively.

In this configuration, even when the contact portions are disposed at the plurality of positions, a shift in the core does not occur, and it is possible to perform stable support.

According to a fifteenth aspect of this disclosure, in the closed compressor according to any one of the first to fourteenth aspects, at least one of the curved surface and the receiving surface is formed of a resin material.

In this configuration, in the case where the impact is applied from the outside, it is possible to prevent the collision noise from being produced between the curved surface and the receiving surface.

According to a sixteenth aspect of this disclosure, in the closed compressor according to any one of the first to fourteenth aspects, a resin buffer member is provided between the curved surface and the receiving surface.

In this configuration, in the case where the impact is applied from the outside, it is possible to prevent the collision noise from being produced between the curved surface and the receiving surface.

According to a seventeenth aspect of this disclosure, in the closed compressor according to any one of the first to sixteenth aspects, the support has a restriction member that restricts displacement of the compressor body with respect to the receiving surface.

In this configuration, it is possible to restrict displacement of the compressor body in a large amount such that it is possible to prevent a collision noise of the compressor body with the closed vessel. In addition, it is possible to prevent the compressor body from shifting from a predetermined position with respect to the closed vessel, and it is possible to prevent compression performance from being degraded due to the shift in positions of the gas suction port formed in the closed vessel and the suction muffler that guides suctioned gas to the compression chamber.

According to an eighteenth aspect of this disclosure, in the closed compressor according to the seventeenth aspect, the restriction member is formed of a thin plate made of an elastic material, and one end of the thin plate is attached to the compressor body and the other end of the thin plate is attached to the closed vessel.

In this configuration, it is possible to realize the restriction member in the simple configuration of using a thin plate such that it is possible to prevent vibration from increasing due to the free oscillation of the compressor body.

According to a nineteenth aspect of this disclosure, in the closed compressor according to any one of the first to eighteenth aspects, the bearing is formed to have an upper bearing that is disposed on an upper side from the electric element and a lower bearing that is disposed on a lower side from the electric element.

In this configuration, the bearing is divided into two portions and the lower bearing is disposed on the lower side of the electric element, and thereby it is possible to lower the center of gravity of the compressor body. Therefore, it is possible to reduce an occurrence of oscillation of the compressor body such that it is possible to prevent the compressor body and the closed vessel from colliding with each other.

According to a twentieth aspect of this disclosure, in the closed compressor according to any one of the first to nineteenth aspects, the support is formed with the cylinder block.

In this configuration, the support is formed with the cylinder block, and thereby it is possible to reduce the number of component members and it is possible to increase productivity.

According to a twenty-first aspect of this disclosure, in the closed compressor according to any one of the first to twentieth aspects, the crankshaft is formed to have the main shaft and the eccentric shaft, and the center of gravity of the compressor body is positioned between the cylinder and the main shaft.

In this configuration, there is no need to dispose an object having the same mass as that of the cylinder on a side opposite to the cylinder with respect to the main shaft, and thus, it is possible to achieve light weight of the closed compressor and reduction in costs.

According to a twenty-second aspect of this disclosure, in the closed compressor according to any one of the first to twenty-first aspects, the rotation axis of the crankshaft is set to a vertical direction, and the piston is configured to perform the reciprocating motion in the horizontal direction.

In this configuration, the piston performs the reciprocating motion in the horizontal direction, and thereby it is possible to prevent a force from acting in the vertical direction from the support such that it is possible to decrease the occurrence of vibration of the closed compressor.

According to a twenty-third aspect of this disclosure, in the closed compressor according to any one of the first to twenty-second aspects, the piston is disposed above the center of gravity of the compressor body.

In this configuration, the acting force in the translation direction, which is produced at a contact position between the curved surface and the inner bottom due to the reciprocating motion of the piston, and the acting force due to the moment act in opposite orientations from each other, and thus it is possible to reduce the occurrence of oscillation of the compressor body.

According to a twenty-fourth aspect of this disclosure, in the closed compressor according to any one of the first to twenty-third aspects, the crankshaft is provided with a plurality of balance weights on which the centrifugal force acts.

In this configuration, the occurrence of the rotational vibration due to the unbalance of the compression element is reduced, and low vibration is achieved.

According to a twenty-fifth aspect of this disclosure, in the closed compressor according to the twenty-fourth aspect, the plurality of balance weights are disposed above and below a horizontal plane containing a central axis of the piston.

In this configuration, the occurrence of the rotational vibration due to the unbalance of the compression element is reliably reduced, and low vibration is achieved.

According to a twenty-sixth aspect of this disclosure, in the closed compressor according to the twenty-fourth aspect, the plurality of balance weights are disposed only below the horizontal plane containing a central axis of the piston.

In this configuration, the occurrence of the rotational vibration due to the unbalance of the compression element is reliably reduced, and low vibration is achieved.

According to a twenty-seventh aspect of this disclosure, in the closed compressor according to any one of the twenty-fourth to twenty-sixth aspects, the closed vessel is elastically supported, and, when the direction of the reciprocating motion of the piston is set to the x direction, and the direction orthogonal to the x direction on the horizontal plane is set to the y direction, the acceleration in the x direction at the height of the center of gravity of the compressor body is set to the first acceleration, and the acceleration in the y direction at the height of the support is set to the second acceleration, the balance weight is disposed such that the second acceleration is lower than or equal to one fifth of the first acceleration.

In this configuration, the occurrence of the vibration in the y direction due to the unbalance of the compression element is reduced, and low vibration is achieved.

According to a twenty-eighth aspect of this disclosure, in the closed compressor according to any one of the twenty-fourth to twenty-sixth aspects, the closed vessel is elastically supported, and, when the direction of the reciprocating motion of the piston is set to the x direction, and the direction orthogonal to the x direction on the horizontal plane is set to the y direction, the acceleration in the x direction at the height of the center of gravity of the compressor body is set to the first acceleration, and the acceleration in the y direction at the height of the support is set to the second acceleration, the support is disposed such that the second acceleration is lower than or equal to one fifth of the first acceleration.

In this configuration, the occurrence of the vibration in the x direction, based on the center of the impact is reduced, and low vibration is achieved.

According to a twenty-ninth aspect of this disclosure, in the closed compressor according to any one of the first to twenty-eighth aspects, the electric element has a rotor and a stator, and the support has an opening through which a jig is able to be inserted into a clearance, at a position facing the clearance formed between the rotor and the stator.

In this configuration, since it is possible to insert the clearance gauge as the jig, and thus it is possible to secure assembly properties of the electric element such that it is possible to dispose the support on the lower side of the compressor body.

According to a thirtieth aspect of this disclosure, in the closed compressor according to any one of the first to twenty-eighth aspects, the electric element has the rotor and the stator, the support is attached to the compressor body via an auxiliary member, and the auxiliary member has the opening through which a jig is able to be inserted into the clearance, at the position facing the clearance formed between the rotor and the stator.

In this configuration, since it is possible to insert the clearance gauge as the jig, and thus it is possible to secure assembly properties of the electric element such that it is possible to dispose the support on the lower side of the compressor body.

According to a thirty-first aspect of this disclosure, in the closed compressor according to any one of the first to twenty-eighth aspects, the electric element has a rotor and a stator, and the rotor is disposed on an inner diameter side of the stator.

In this configuration, it is possible to attach the support via the stator such that the structure of the support is simplified, and it is possible to reduce manufacturing costs.

According to a thirty-second aspect of this disclosure, in the closed compressor according to the twenty-ninth aspect or the thirtieth aspect, the rotor is disposed on an inner diameter side of the stator.

In this configuration, it is possible to attach the support via the stator such that the structure of the support is simplified, and it is possible to reduce manufacturing costs.

According to a thirty-third aspect of this disclosure, in the closed compressor according to any one of the first to twenty-eighth aspects, the electric element has a rotor and a stator, and the rotor is disposed on an outer diameter side of the stator.

In this configuration, the inertia increases, the rotation is stabilized at the low rotation, and high efficiency is achieved at the low rotations.

According to a thirty-fourth aspect of this disclosure, in the closed compressor according to the twenty-ninth aspect or the thirtieth aspect, the rotor is disposed on an outer diameter side of the stator.

In this configuration, the inertia increases, the rotation is stabilized at the low rotation, and high efficiency is achieved at the low rotations.

According to a thirty-fifth aspect of this disclosure, in the closed compressor according to any one of the first to thirty-fourth aspects, the electric element is driven using an inverter, thereby being driven at a plurality of set numbers of rotations, and the plurality of set numbers of rotations include a number of rotations which is lower than a commercial power frequency.

In this configuration, high efficiency is achieved in the reduction in the occurrence of vibration at the low number of rotations.

The refrigeration device according to a thirty-sixth aspect of this disclosure uses the closed compressor according to any one of the first to thirty-fifth aspects.

In this configuration, the transmission of the vibration from the closed vessel is reduced, and thereby it is possible to realize the refrigeration device at the low vibration.

INDUSTRIAL APPLICABILITY

As described above, according to the invention, the occurrence of the vibration at the low number of rotations is reduced, and thereby it is possible to achieve a remarkable efficiency in that it is possible to perform an operation at the low rotations. Accordingly, the invention is useful because the invention is not limited to the closed compressor and a household electric refrigerator-freezer, and can be applied to an air-conditioner, a showcase, a vending machine, and another type of refrigeration device, or the like.

REFERENCE MARKS IN THE DRAWINGS 10, 10A to 10L closed compressor
50 elastic member
100 compressor body
110 electric element
111 stator
112 rotor
113 clearance
120 compression element
121 cylinder
122 cylinder block
123 piston
123*a* connecting rod
123*c* central axis
123*s* vertical plane
124 crankshaft
124*a* main shaft
124*b* eccentric shaft
124*c* axial core
125 bearing
125U upper bearing
125L lower bearing
126 compression chamber
127, 127*a*, 127*b*, 127*c*, 127*d* balance weight 128 valve plate
128a suction port
128b discharge port
128c reed valve
128d reed valve
129 cylinder head
129a high-pressure chamber
130 discharge pipe
131 suction muffler
131a muffling space
132 suction pipe
200 closed vessel
201 inner bottom
211, 221 receiving surface
300 support
301 curved surface
301c center of curvature (central axis of curvature)
305 contact portion
302 restriction member
302a thin plate
302b one end
302c the other end
302d first magnetism portion
302e second magnetism portion
302X magnetism unit
302Y spring
310 support
311 curved surface
311c center of curvature (central axis of curvature)
315 contact portion
320 support
321 curved surface
325 contact portion
330 support
331 curved surface
332 leg
333 opening
340 support
401 thermal insulation box body
411 inner box
412 outer box
413 thermal insulation member
421 cooling compartment
422 switching compartment
423 ice compartment
424 vegetable compartment
425 refrigeration compartment
431 cooling-compartment rotation door
432 switching-compartment drawing door
433 ice-compartment drawing door
434 vegetable-compartment drawing door
435 refrigeration-compartment drawing door
440 recessed portion
441 elastic support
451 capillary
452 cooling fan
453 evaporator
500 auxiliary member
501 opening
F resilience
F1, F2 acting force
G center of gravity
Gh horizontal plane
P excitation force

The invention claimed is:

1. A closed compressor comprising:
a compressor body; and
a closed vessel in which the compressor body is accommodated and oil is stored,
wherein the compressor body has an electric element and a compression element that is driven by the electric element,
wherein the compression element has
a cylinder block that forms a cylinder,
a piston that performs a reciprocating motion in the cylinder, and
a crankshaft that actuates the piston,
wherein the cylinder block configures a bearing that pivotally supports the crankshaft,
wherein the cylinder forms a compression chamber,
wherein the compressor body has a support that forms a curved surface, the support being fixed to the compressor body,
wherein a contact portion, at which the curved surface comes into contact with a receiving surface in the closed vessel, is formed,
wherein the support is not fixed on the receiving surface whereby the curved surface of the support is configured to oscillate relative to the receiving surface of the closed vessel, and
wherein a height of a center of curvature of the curved surface is higher than or equal to a height of a center of gravity of the compressor body.

2. The closed compressor of claim 1,
wherein the curved surface is formed in a lower portion of the compressor body, and
wherein the receiving surface is an inner bottom of the closed vessel.

3. The closed compressor of claim 2,
wherein the contact portion is disposed vertically below the center of gravity of the compressor body.

4. The closed compressor of claim 1,
wherein the curved surface is configured of a spherical surface.

5. The closed compressor of claim 1,
wherein the curved surface has at least a first curved surface and a second curved surface, and
wherein the first curved surface and the second curved surface have the centers of curvature at positions which are different from each other.

6. The closed compressor of claim 1,
wherein, when a direction of the reciprocating motion of the piston is set to an x direction, and a direction orthogonal to the x direction on a horizontal plane is set to a y direction, the curved surface has a central axis of curvature in the y direction.

7. The closed compressor of claim 1,
wherein the contact portion is provided at one position, and
wherein the curved surface and the receiving surface come into line contact with each other, and thereby the contact portion is formed.

8. The closed compressor of claim 1,
wherein the contact portion is provided at one position, and
wherein the contact portion is disposed on a cylinder side from a center of a rotation axis of the crankshaft.

9. The closed compressor of claim 1,
wherein a plurality of the contact portions are provided at positions, and wherein the plurality of contact portions are disposed on both sides from a vertical plane containing a central axis of the piston.

10. The closed compressor of claim 1,
wherein a plurality of the contact portions are provided at positions, and
wherein, when the direction of the reciprocating motion of the piston is set to the x direction, the plurality of contact portions are each provided to be able to displace in the x direction.

11. The closed compressor of claim 1,
wherein, when a plurality of the contact portions are provided at positions, a direction of the reciprocating motion of the piston is set to an x direction, and a direction orthogonal to the x direction on a horizontal plane is set to a y direction, a plurality of the curved surfaces, on which the contact portions are formed, have a common central axis of curvature in the y direction.

12. The closed compressor of claim 1,
wherein a plurality of the contact portions are provided at positions, and
wherein a plurality of the curved surfaces and a plurality of the receiving surfaces come into line contact with each other, and thereby the plurality of contact portions are formed, respectively.

13. The closed compressor of claim 1,
wherein a plurality of the contact portions are provided at positions, and
wherein a plurality of the curved surfaces and a plurality of the receiving surfaces come into point contact with each other, and thereby the plurality of contact portions are formed, respectively.

14. The closed compressor of claim 1,
wherein at least one of the curved surface and the receiving surface is formed of a resin material.

15. The closed compressor of claim 1,
wherein a resin buffer member is provided between the curved surface and the receiving surface.

16. The closed compressor of claim 1,
wherein the support has a restriction member that restricts displacement of the compressor body with respect to the receiving surface.

17. The closed compressor of claim 16,
wherein the restriction member is formed of a thin plate made of an elastic material, and
wherein one end of the thin plate is attached to the compressor body and the other end of the thin plate is attached to the closed vessel.

18. The closed compressor of claim 1,
wherein the support is formed with the cylinder block.

19. The closed compressor of claim 1,
wherein the crankshaft is formed to have a main shaft and an eccentric shaft, and
wherein the center of gravity of the compressor body is positioned between the cylinder and the main shaft.

20. The closed compressor of claim 1,
wherein the rotation axis of the crankshaft is set to a vertical direction, and the piston is configured to perform the reciprocating motion in a horizontal direction.

21. The closed compressor of claim 1,
wherein the piston is disposed above the center of gravity of the compressor body.

22. The closed compressor of claim 1,
wherein the crankshaft is provided with a plurality of balance weights on which a centrifugal force acts.

23. The closed compressor of claim 22,
wherein the plurality of balance weights are disposed above and below a horizontal plane containing the central axis of the piston.

24. The closed compressor of claim 22,
wherein the plurality of balance weights are disposed only below the horizontal plane containing a central axis of the piston.

25. The closed compressor claim 1,
wherein the electric element has a rotor and a stator, and
wherein the rotor is disposed on an inner diameter side of the stator.

26. The closed compressor of claim 1,
wherein the electric element has a rotor and a stator, and
wherein the rotor is disposed on an outer diameter side of the stator.

27. The closed compressor of claim 1,
wherein the electric element is driven using an inverter, thereby being driven at a plurality of set numbers of rotations, and
wherein the plurality of set numbers of rotations include a number of rotations which is lower than a commercial power frequency.

28. A refrigeration device comprising:
the closed compressor of claim 1.

29. A closed compressor comprising:
a compressor body; and
a closed vessel in which the compressor body is accommodated and oil is stored,
wherein the compressor body has an electric element and a compression element that is driven by the electric element,
wherein the compression element has
a cylinder block that forms a cylinder,
a piston that performs a reciprocating motion in the cylinder, and
a crankshaft that actuates the piston,
wherein the cylinder block configures a bearing that pivotally supports the crankshaft,
wherein the cylinder forms a compression chamber,
wherein the compressor body has a support that forms a curved surface, the support being fixed to the compressor body,
wherein a contact portion, at which the curved surface comes into contact with a receiving surface in the closed vessel, is formed,
wherein the support is not fixed on the receiving surface whereby the curved surface of the support is configured to oscillate relative to the receiving surface of the closed vessel, and
wherein the bearing is formed to have an upper bearing that is disposed on an upper side from the electric element and a lower bearing that is disposed on a lower side from the electric element.

30. A closed compressor comprising:
a compressor body; and
a closed vessel in which the compressor body is accommodated and oil is stored,
wherein the compressor body has an electric element and a compression element that is driven by the electric element,
wherein the compression element has
a cylinder block that forms a cylinder,
a piston that performs a reciprocating motion in the cylinder, and
a crankshaft that actuates the piston,
wherein the cylinder block configures a bearing that pivotally supports the crankshaft,
wherein the cylinder forms a compression chamber, wherein the compressor body has a support that forms a curved surface, the support being fixed to the compressor body, wherein a contact portion, at which the curved surface comes into contact with a receiving surface in the closed vessel, is formed, wherein the support is not fixed on the receiving surface whereby the curved surface of the support is configured to oscillate relative to the receiving surface of the closed vessel, wherein the crankshaft is provided with a plurality of balance weights on which a centrifugal force acts, wherein the closed vessel is elastically supported, and wherein, when the direction of the reciprocating motion of the piston is set to the x direction, and the direction orthogonal to the x direction on the horizontal plane is set to the y direction, acceleration in the x direction at a height of a center of gravity of the compressor body is set to first acceleration, and acceleration in the y direction at a height of the support is set to second acceleration, each of the balance weights is disposed such that the second acceleration is lower than or equal to one fifth of the first acceleration.

31. A closed compressor comprising:

a compressor body; and a closed vessel in which the compressor body is accommodated and oil is stored, wherein the compressor body has an electric element and a compression element that is driven by the electric element, wherein the compression element has
a cylinder block that forms a cylinder,
a piston that performs a reciprocating motion in the cylinder, and
a crankshaft that actuates the piston, wherein the cylinder block configures a bearing that pivotally supports the crankshaft, wherein the cylinder forms a compression chamber, wherein the compressor body has a support that forms a curved surface, the support being fixed to the compressor body, wherein a contact portion, at which the curved surface comes into contact with a receiving surface in the closed vessel, is formed, wherein the support is not fixed on the receiving surface whereby the curved surface of the support is configured to oscillate relative to the receiving surface of the closed vessel, wherein the crankshaft is provided with a plurality of balance weights on which a centrifugal force acts, wherein the closed vessel is elastically supported, and wherein, when the direction of the reciprocating motion of the piston is set to the x direction, and the direction orthogonal to the x direction on the horizontal plane is set to the y direction, acceleration in the x direction at a height of a center of gravity of the compressor body is set to first acceleration, and acceleration in the y direction at a height of the support is set to second acceleration, the support is disposed such that the second acceleration is lower than or equal to one fifth of the first acceleration.

32. A closed compressor comprising:

a compressor body; and a closed vessel in which the compressor body is accommodated and oil is stored, wherein the compressor body has an electric element and a compression element that is driven by the electric element, wherein the compression element has
a cylinder block that forms a cylinder,
a piston that performs a reciprocating motion in the cylinder, and
a crankshaft that actuates the piston, wherein the cylinder block configures a bearing that pivotally supports the crankshaft, wherein the cylinder forms a compression chamber, wherein the compressor body has a support that forms a curved surface, the support being fixed to the compressor body, wherein a contact portion, at which the curved surface comes into contact with a receiving surface in the closed vessel, is formed, wherein the support is not fixed on the receiving surface whereby the curved surface of the support is configured to oscillate relative to the receiving surface of the closed vessel, wherein the electric element has a rotor and a stator, and wherein the support has an opening through which a jig is able to be inserted into a clearance formed between the rotor and the stator, at a position facing the clearance.

33. The closed compressor of claim 32, wherein the rotor is disposed on an inner diameter side of the stator.

34. The closed compressor of claim 32, wherein the rotor is disposed on an outer diameter side of the stator.

35. A closed compressor comprising:

a compressor body; and a closed vessel in which the compressor body is accommodated and oil is stored, wherein the compressor body has an electric element and a compression element that is driven by the electric element, wherein the compression element has
a cylinder block that forms a cylinder,
a piston that performs a reciprocating motion in the cylinder, and
a crankshaft that actuates the piston, wherein the cylinder block configures a bearing that pivotally supports the crankshaft, wherein the cylinder forms a compression chamber, wherein the compressor body has a support that forms a curved surface, the support being fixed to the compressor body, wherein a contact portion, at which the curved surface comes into contact with a receiving surface in the closed vessel, is formed, wherein the support is not fixed on the receiving surface whereby the curved surface of the support is configured to oscillate relative to the receiving surface of the closed vessel, wherein the electric element has a rotor and a stator, wherein the support is attached to the compressor body via an auxiliary member, and wherein the auxiliary member has an opening through which a jig is able to be inserted into a clearance formed between the rotor and the stator, at a position facing the clearance.

* * * * *